United States Patent
Feng et al.

(10) Patent No.: US 10,778,784 B2
(45) Date of Patent: Sep. 15, 2020

(54) NETWORK SERVICE ACCESS CHARACTERISTICS SPECIFIC CLIENT STEERING

(71) Applicant: Extreme Networks, Inc., San Jose, CA (US)

(72) Inventors: Wei Feng, Sunnyvale, CA (US); Vineet Verma, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 468 days.

(21) Appl. No.: 15/439,874

(22) Filed: Feb. 22, 2017

(65) Prior Publication Data

US 2018/0242332 A1 Aug. 23, 2018

(51) Int. Cl.
| | | |
|---|---|---|
| H04L 29/08 | (2006.01) | |
| H04W 48/18 | (2009.01) | |
| H04W 84/12 | (2009.01) | |

(52) U.S. Cl.
CPC ............ *H04L 67/16* (2013.01); *H04W 48/18* (2013.01); *H04L 67/303* (2013.01); *H04W 84/12* (2013.01)

(58) Field of Classification Search
CPC ... H04L 67/16; H04L 67/2814; H04L 67/303; H04W 24/02; H04W 24/10; H04W 48/16; H04W 48/20; H04W 84/12
See application file for complete search history.

(56) References Cited

U.S. PATENT DOCUMENTS

| | | |
|---|---|---|
| 2009/0252097 A1 | 10/2009 | Iyer |
| 2009/0274129 A1 | 11/2009 | Ponnuswamy |
| 2014/0254362 A1 | 9/2014 | Ganu |
| 2014/0254422 A1* | 9/2014 | Mehta .................... H04W 8/005 370/254 |
| 2016/0007278 A1 | 1/2016 | Gupta |
| 2018/0206184 A1* | 7/2018 | Bahr ...................... H04W 48/20 |

OTHER PUBLICATIONS

Aruba Networks, Inc., "Configuring Support for 802.11r and OKC: Configuring Fast Roaming for Wireless Clients," Mar. 29, 2015 [retrieved online at http://www.arubanetworks.com/techdocs/Instant_41_Mobile/Advanced/Content/UG_files/WLAN_SSID_conf/Support%20for%20dot11r.htm on May 23, 2017].

Cisco Systems, Inc., "Enterprise Mobility 8.1 Design Guide: Chapter 11—802.11r, 802.11k, 802.11v, 802.11w Fast Transition Roaming," Nov. 21, 2016 [retrieved online at http://www.cisco.com/c/en/us/td/docs/wireless/controller/8-1/Enterprise-Mobility-8-1-Design-Guide/Enterprise_Mobility_8_1_Deployment_Guide/Chapter-11.html on May 23, 2017].

Ruckus Wireless, Inc. "New Ruckus Smart Wi-Fi Technology Innovations Uniquely Enable Carrier-Class Wi-Fi Calling," Feb. 9, 2015 [retrieved online at https://www.prnewswire.com/news-releases/new-ruckus-smart-wi-fi-technology-innovations-uniquely-enable-carrier-class-wi-fi-calling-300032324.html on Aug. 9, 2019].

\* cited by examiner

*Primary Examiner* — Khoa Huynh
(74) *Attorney, Agent, or Firm* — Sterne, Kessler, Goldstein & Fox P.L.L.C.

(57) ABSTRACT

Systems and methods for steering clients based on network service access characteristics. Systems can include a network service access characteristics specific network device client steering system and a network service access characteristics specific radio client steering system. Methods can include steering clients to network devices in accessing network services based on network service access characteristics and steering clients to radios in accessing network services based on network service access characteristics.

16 Claims, 10 Drawing Sheets

NETWORK SERVICE ACCESS CHARACTERISTICS SPECIFIC CLIENT STEERING

DETAILED DESCRIPTION

Figure 1:
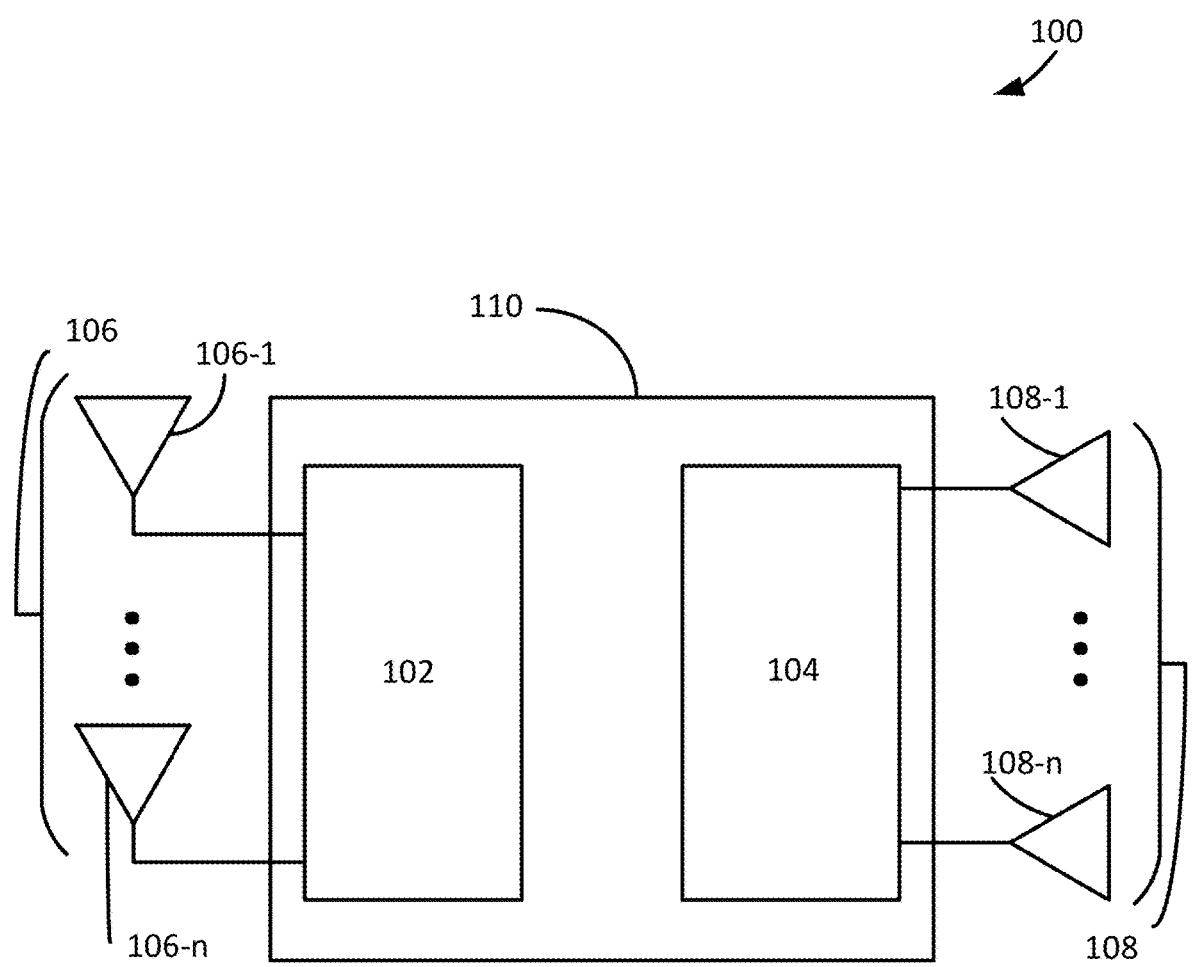
FIG. 1 depicts a diagram of an example of a single band dual concurrent network device.

FIG. 1 depicts a diagram 100 of an example of a single band dual concurrent network device. As used in this paper, a network device is intended to represent a router, a switch, an access point, a gateway (including a wireless gateway), a repeater, or any combination thereof. In functioning as a gateway, the network device can transport data from a backend of a network to a device coupled to the network device. In functioning as an access point, the network device can couple a device coupled to the network device to a network associated with the network device. The network device can function according to applicable protocols for forming part of a wireless network, such as Wi-Fi.

The single band dual concurrent network device can include a computer-readable medium. Computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Computer readable mediums discussed in this paper are intended to represent a variety of potentially applicable technologies. For example, a computer-readable medium implemented as part of the single band dual concurrent network device can be used to form a network or part of a network. Where two components are co-located on a device, a computer-readable medium can include a bus or other data conduit or plane. Where a first component is co-located on one device and a second component is located on a different device, a computer-readable medium can include a wireless or wired back-end network or LAN. A computer-readable medium can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that edge devices can access over a communication interface, such as a network. As used in this paper, edge devices include applicable devices at an edge of one or a combination of a LAN, a WLAN, a consumer network, and an enterprise network. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. That is, the engine includes hardware. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning back to FIG. 1, in a specific implementation, the example single band dual concurrent network device and its various components function to provide a client device access to network services through wireless connections established and maintained according to an applicable wireless protocol, e.g. a Wi-Fi connection and corresponding IEEE 802.11 standards. In providing a client device access to network services through a Wi-Fi connection, either or both the single band dual concurrent network device and the client device act as or include stations. A station, as used in this paper, can be referred to as a device with a media access control (MAC) address and a physical layer (PHY) interface to a wireless medium that complies with the IEEE 802.11 standard. Thus, for example, the end user devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the example single band dual concurrent network device and its various components are compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

Conventional network devices must be of a suitable size for consumer adoption. Because a typical size of a network device, such as a wireless access point, is small enough to be mounted on a ceiling (typically less than a foot in any horizontal direction and typically no thicker than 2 inches), simultaneous radio operation is considered difficult or impossible. Advantageously, by utilizing polarized antennas, a network device, such as the single band dual concurrent network device shown in FIG. 1 can be fashioned to meet the consumer-driven requirements of a relatively small form factor suitable for mounting on ceilings or walls.

As used in this paper, the network device is single band and dual concurrent in that it includes two radio modules capable of operating within the same frequency band simultaneously with non-debilitating mutual interference between signals transmitted by the two radio modules. Depending upon implementation-specific or other considerations, respective antennas utilized by the radios to transmit signals within the same frequency band simultaneously have at least 40 dB or greater of antenna isolation. For example, a first one or a plurality of antennas transmitting signals within the 5 GHz frequency band and operating with a first radio module operating concurrently with a second one or a plurality of antennas transmitting signals concurrently within the 5 GHz frequency band and operating with a second radio module have 45 dB of antenna isolation with the second one or a plurality of antennas.

The single band dual concurrent network device shown in FIG. 1 includes a first radio module 102 and a second radio module 104. Either or both the first radio module 102 and the second radio module 104 can be mounted on a printed circuit board (hereinafter referred to as "PCB") of the single band dual concurrent network device. Alternatively, either or both the first radio module 102 and the second radio module 104 can be integrated in separate modules housed within an enclosure of the single band dual concurrent network device. For example, the first radio module 102 can be integrated in a first module and the second radio module 104 can be integrated as part of a second module separate from the first module.

In a specific implementation, either or both the first radio module 102 and the second radio module 104 are dual band radios capable of dynamically switching operation between different frequency bands. For example, either or both the first radio module 102 and the second radio module 104 can be capable of transmitting signals in the 2.4 GHz and the 5 GHz frequency bands. In another example, only one of the first radio module 102 and the second radio module 104 is capable of transmitting signals in the 2.4 GHz and the 5 GHz frequency bands, while the other is only capable of transmitting signals in either the 5 GHz frequency band or the 2.4 GHz frequency band. The first radio module 102 and the second radio module 104 are capable of operating simultaneously within the same frequency band. For example, both the first radio module 102 and the second radio module 104 can transmit and receive signals in the 5 GHz frequency band simultaneously. Additionally, either or both the first radio module 102 and the second radio module 104 are single band radios capable of only operating in a single frequency band, e.g. the 2.4 GHz frequency band or the 5 GHz frequency band.

In a specific implementation, either or both the first radio module 102 and the second radio module 104 function as either a wave 1 radio or a wave 2 radio in providing network service access. For example, the first radio module 102 can function as a wave 2 radio, e.g. by providing network service access through MU-MIMO, while the second radio module 104 can function as a wave 1 radio, e.g. by providing network service access through SU-MIMO. Either or both the first radio module 102 and the second radio module can dynamically switch from operating as a wave 1 radio to operating as a wave 2 radio. Additionally, the first radio module 102 and the second radio module 104 can operate concurrently as the same wave radio type. For example, the first radio module 102 and the second radio module 104 can operate concurrently as wave 2 radios.

The single band dual concurrent network device shown in FIG. 1 includes a first antenna array 106 comprising antennas 106-1 . . . 106-$n$ and a second antenna array 108 comprising antennas 108-1 . . . 108-$n$. The first antenna array 106 is associated with the first radio module 102 and is used to transmit and receive signals for the first radio module 102 and the second antenna array 108 is associated with the second radio module 104 and used to transmit and receive signals for the second radio module 104. The first antenna array 106 and the second antenna array 108 can include an applicable number of antennas. For example, the first antenna array 106 and the second antenna array 108 can each include four corresponding antennas.

In a specific implementation, antennas forming the first antenna array 106 are of the same polarization, and antennas forming the second antenna array 108 are of the same polarization. For example, antennas forming the first antenna array 106 can all be either vertically polarized or horizontally polarized with respect to the single band dual concurrent network device. In another example, antennas forming the second antenna array 108 can all be either vertically polarized or horizontally polarized with respect to the single band dual concurrent network device.

In a specific implementation, antennas forming the first antenna array 106 are orthogonally polarized with respect to the antennas forming the second antenna array 108. As a result, the first radio module 102 and the second radio module 104 utilize corresponding polarized antennas having a 90° phase offset from each other. For example, the first antenna array 106 can be formed by vertically polarized antennas that are positioned to have a +45° phase offset with respect to a center of the single band dual concurrent network device, while the second antenna array 108 can be formed by horizontally polarized antennas that are positioned to have a −45° phase offset with respect to the center of single band dual concurrent network device, thereby leading to a 90° phase offset between the antennas forming the first antenna array 106 and the antennas forming the second antenna array 108. While in the previous example antenna position and phase offset are discussed with respect to a center of the single band dual concurrent network device, positions and phase offsets of antennas forming the first antenna array 106 and antennas forming the second antenna array 108 can be considered with reference to an applicable point, axis, or plane within the single band dual concurrent network device or in an environment surrounding the single band dual concurrent network device as long as the antennas forming the first antenna array 106 and the antennas forming the second antenna array 108 are orthogonally polarized with respect to each other. Due to orthogonal polarization between antennas forming the first antenna array 106 and antennas forming the second antenna array 108, at least 40 dB of antenna isolation can be achieved between the antennas forming the first antenna array 106 and the antennas forming the second antenna array 108.

In a specific implementation, the first antenna array 106 and the second antenna array 108 are mounted about a main PCB of the single band dual concurrent network device. Antennas of the first antenna array 106 and the second antenna array 108 can be mounted at positions at least 5 mm away from edges of the main PCB. Depending upon implementation-specific or other considerations, the first antenna array 106 and the second antenna array 108 are mounted about a main PCB based on a polarization direction of antennas forming the first antenna array 106 and the second antenna array 108. For example, if antennas forming the first antenna array 106 are vertically polarized with respect to a center of the single band dual concurrent network device, then the antennas can be positioned at 30 mm out from edges of a main PCB along a plane that extends out from the edges of the main PCB. In another example, if antennas forming the second antenna array 108 are horizontally polarized with respect to a center of the single band dual concurrent network device, then the antennas can be positioned 5 mm out from edges of a main PCB along a plane that extends out from the edges of the main PCB and 5 mm below or beneath the plane. In mounting antennas of the first antenna array 106 and the second antenna array 108 at positions away from a main PCB of the single band dual concurrent network device, antenna coupling through the main PCB between the first antenna array 106 and the second antenna array 108 is reduced, thereby leading to at least 40 dB of antenna isolation between the antennas forming the first antenna array 106 and the antennas forming the second antenna array 108.

In a specific implementation, the first antenna array 106 and the second antenna array 108 are mounted onto an antenna plate. Antennas of the first antenna array 106 and the second antenna array 108 can be mounted to an antenna plate such that the antennas are at least 5 mm away from edges of the antenna plate. The first antenna array 106 and the second antenna array 108 can be mounted to an antenna plate based on a polarization direction of antennas forming the first antenna array 106 and the second antenna array 108. For example, if antennas forming the first antenna array 106 are vertically polarized with respect to a center of the single band dual concurrent network device, then the antennas can be mounted to an antenna plate at positions 30 mm from edges of the antenna plate. In mounting antennas of the first antenna array 106 and the second antenna array 108 to an antenna plate at positions away from edges of the antenna plate, an amount of antenna coupling, through the antenna plate, between the first antenna array 106 and the second antenna array 108 is reduced, thereby leading to at least 40 dB of antenna isolation between the antennas forming the first antenna array 106 and the antennas forming the second antenna array 108. An antenna plate to which antennas of the first antenna array 106 and the second antenna array 108 are mounted can be positioned within the single band dual concurrent network device such that spacing between the antennas of the first antenna array 106 and the second antenna array 108 and edges of a main PCB or other applicable common metal structure is at least 5 mm. For example, an antenna plate can be mounted at a position on top of, on bottom of, or on side of a main PCB such that spacing between antennas of the first antenna array 106 and the second antenna array 108 and edges of the main PCB is at least 5 mm.

The single band dual concurrent network device includes a housing 110. While antennas of the first antenna array 106 and antennas of the second antenna array 108 are shown to extend out of the housing 110 in FIG. 1, this is shown for conceptual purposes and it is understood that the antennas can be contained within the housing 110 or integrated as part of the housing 110. The housing 110 can have a footprint less than 50 cm by 50 cm. For example, the housing 110 can have a footprint that is less than or equal to 40 cm by 40 cm.

In a specific implementation, the single band dual concurrent network device includes low noise amplifiers (hereinafter referred to as "LNAs") coupled to the antennas. Gain of the LNAs can be adjusted in order to increase the dynamic range of the first radio module 102 and the second radio module 104. In increasing the dynamic range of the first radio module 102 and the second radio module 104, the first radio module 102 and the second radio module 104 are capable of receiving signals at larger strengths than signals received at weaker strengths resulting from interference caused by concurrent operation of the first radio module 102 and the second radio module 104 within the same frequency band. A gain of the LNAs can be adjusted using either or both a bypass circuit or post LNA attenuation circuitry. For example, signals amplified by the LNA can be attenuated in order for the radio modules to process signals with larger strength caused by mutual interference.

In an example of operation of the example single band dual concurrent network device shown in FIG. 1, the first radio module 102 operates in the 2.4 GHz frequency band while the second radio module 104 simultaneously operates in the 5 GHz frequency band. In the example of operation of the example network device shown in FIG. 1, the first radio module 102 switches to operation in the 5 GHz frequency band while the second radio module 104 continues to operate, simultaneously with the first radio module 102, in the same 5 GHz frequency band. Further, in the example of operation of the example single band dual concurrent network device shown in FIG. 1, at least 40 dB of antenna isolation is maintained between the first radio module 102 and the second radio module 104 while both radio modules are operating simultaneously in the 5 GHz frequency band.

Figure 2:
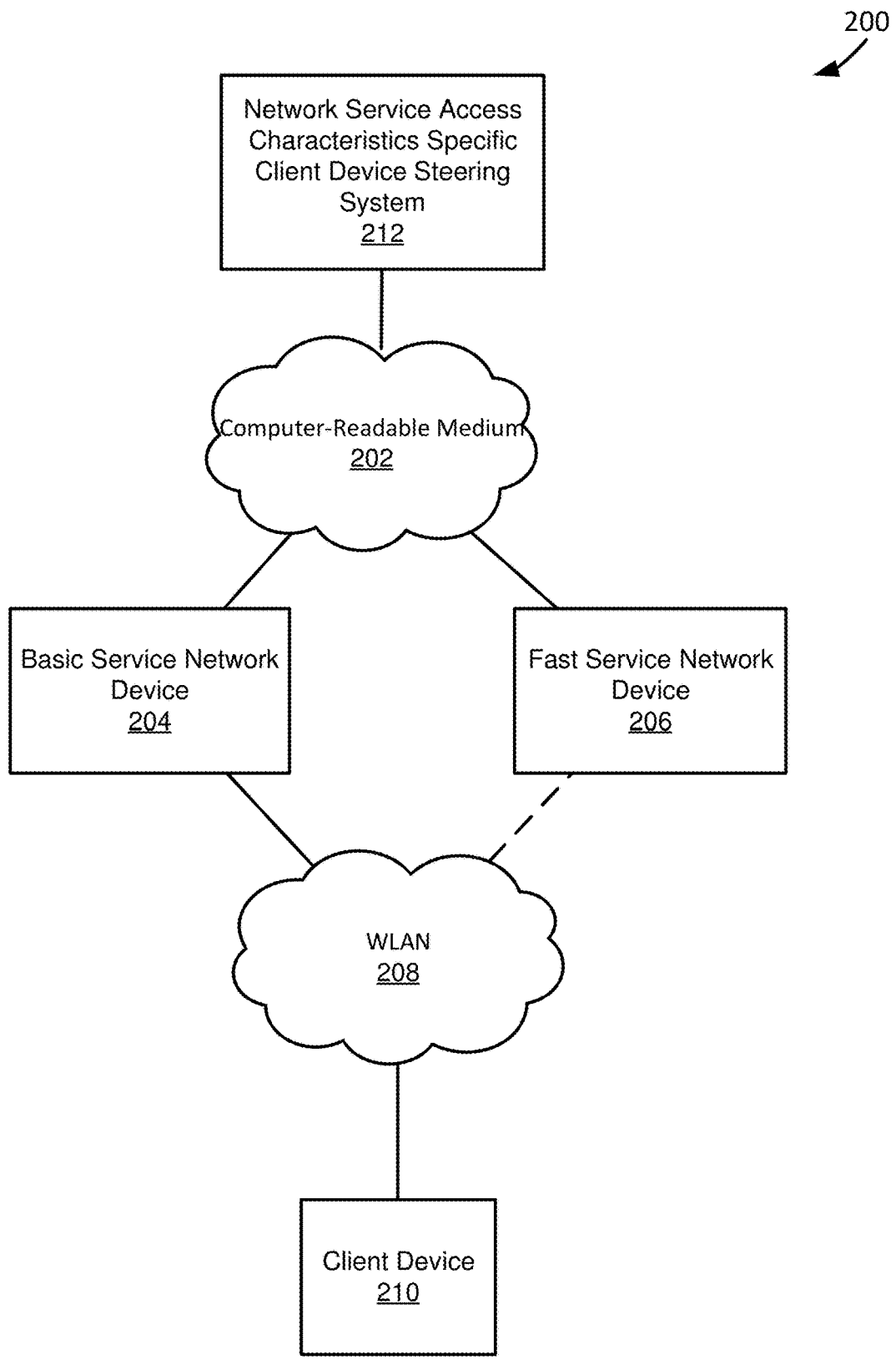
FIG. 2 depicts a diagram of a system for steering client devices in exploiting network services based on network service access characteristics.

FIG. 2 depicts a diagram 200 of a system for steering client devices in exploiting network services based on network service access characteristics. The example system shown in FIG. 2 includes a computer-readable medium 202, a basic service network device 204, a special service network device 206, a WLAN 208, a client device 210, and a network service access characteristics specific client device steering system 212. In the example system shown in FIG. 2, the basic service network device 204 and the special service network device 206 are coupled to the network service access characteristics specific client device steering system 212 through the computer-readable medium 202. Further, in the example system shown in FIG. 2, the client device 210 is coupled to either or both the basic service network device 204 and the special service network device 206 through the WLAN 208.

The basic service network device 204 is intended to represent a network device that functions to provide basic service coverage to client devices for accessing network services through a WLAN. The basic service network device 204 can be referred to as an anchor network device. In providing basic service coverage, the basic service network device 204 can operate according to an applicable network device providing network service access using a 2.4 GHz radio and a 5 GHz radio. For example, in providing basic service coverage for accessing network services, the basic service network device 204 can operate simultaneously in the 2.4 GHz band and the 5 GHz band, operate with a channel width of 20 MHz, provide network service access to all client device types, e.g. those not configured to operate with a wave 2 radio, operate at a maximum transmit power and maximum range, provide network service access using SU-MIMO, or operate at a basic rate set and a basic management frame rate. Further in the example, the basic service network device 204 can be configured to operate according to IEEE 802.11n or IEEE 802.11b. The basic service network device 204 can be a single band dual concurrent network device, such as the single band dual concurrent network devices described in this paper, with a first radio configured to operate in the 5 GHz frequency band and a second dual radio configured to operate concurrently in the 2.4 GHz frequency band and not the 5 GHz frequency band, even though the second dual radio is capable of operating in the 5 GHz frequency band. The basic service network device 204 can be a network device statically assigned to operate as a basic service network device 204, e.g. when planning a network configuration, or dynamically configured to operate as a basic service network device 204 when providing network service access.

The special service network device 206 is intended to represent a network device that functions to provide special service coverage to client devices for accessing network services network services through a WLAN. The special service network device 206 can be referred to as a bullet network device or a fast network device in implementations in which one or more of the special services include increasing throughput or other speed-related parameters for network traffic. The special service network device 206 is capable of providing special services for clients that are directed by the special service network device 206 or other network devices to the special service network device 206. For example, high-capability clients can be encouraged to use the special service network device 206.

In a specific implementation, the special service network device 206 provides network service access using two radios operating concurrently in the 5 GHz frequency band. For example, in providing special service coverage for accessing network services, the special service network device 206 can operate at adjustable channel widths of 20 MHz, 40 MHz, and 80 MHz, operate in accordance with 802.11k, 802.11v, and 802.11r, which are incorporated by reference, in supporting client roaming, support MU-MIMO based network service access, operate at an adjustable transmit power and receive signal sensitivity based on signal-to-noise ratios, and operate at adjustable beacon intervals, rates and other management data frame rates. Further in the example, the special service network device 206 can be configured to operate according to IEEE 802.11ac, which is incorporated by reference, as either a wave 1 device or a wave 2 device. The special service network device 206 can be a single band dual concurrent network device, such as the single band dual concurrent network devices described in this paper, with a first radio configured to operate in the 5 GHz frequency band and a second dual radio configured to operate concurrently in the 5 GHz frequency band and not in the 2.4 GHz frequency band, even though the second dual radio is capable of operating in the 2.4 GHz frequency band. The special service network device 206 can be a network device statically assigned to operate as a special service network device 206, e.g. when planning a network configuration, or dynamically configured to operate as a special service network device 206 when providing network service access.

The WLAN 208 is intended to represent a WLAN used by client devices to wirelessly access network services. The WLAN 208 can be formed as part of an applicable wireless protocol, such as Wi-Fi. The WLAN 208 can be formed, at least in part, using an applicable network device used to provide client devices network service access, such as the basic service network devices and special service network devices described in this paper.

The client device 210 is intended to represent a device that functions to access network services through a WLAN. In accessing network services through a WLAN, the client device 210 can include a wireless interface used to transmit and receive data. The client device 210, in accessing network services through Wi-Fi, can be referred to as a station and included as part of a basic service set along with an applicable network device used to provide the client device 210 network service access. The client device 210 can be a thin client or an ultra-thin client.

The network service access characteristics specific client device steering system 212 is intended to represent a system that functions to steer client devices, based on network service access characteristics, to an applicable network device or radio for use by the client devices in exploiting network services. In steering client devices based on network service access characteristics, the network service access characteristics specific client device steering system 212 functions to steer client devices in a manner specific to network service access characteristics. Network service access characteristics include applicable characteristics related to a network device exploiting network services. Examples of network service access characteristics include a device type of a client device, operational parameters of a client device, operational parameters a client device is or is capable of operating at, type of network services a client device is exploiting, and characteristics of a network device or a radio in providing access to network services. For example, network service access characteristics can include whether a client device is capable of accessing network services through a wave 2 network device using MU-MIMO. In another example, network service access characteristics can include a number of client devices a network device is providing access to network services according to IEEE 802.11n. In yet another example, network service characteristics can include whether a client device is accessing network services requiring transmission of large amounts of data, e.g. receiving a video stream.

The network service access characteristics specific client device steering system 212 can be implemented, at least in part, at an applicable device used in providing network service access to client devices. For example, the network service access characteristics specific client device steering system 212 can be implemented at either or both a basic service network device and special service network device. Additionally, the network service access characteristics specific client device steering system 212 can be implemented, at least in part, remote from an applicable device used in providing network service access to client devices. For example, the network service access characteristics specific client device steering system 212 can be implemented as a cloud-based system remote from a basic service network device and a special service network device.

In a specific implementation, network service access characteristics used by the network service access characteristics specific client device steering system 212 to steer client include one or a plurality of link quality measurements. Link quality measurements can be determined or otherwise generated based on applicable factors related to network performance in providing a client device network service access. For example a link quality measurement can be based on one or a combination of operational capabilities and characteristics of a client device in accessing network services, data rates in providing access to network services, packet error rates in providing access to network services, and a number of retries in providing access to network services. Link quality measurements can be determined or otherwise assigned for different levels of network granularity. For example, a LAN can have an overall link quality score or measurement, while a link between a client device and a network device can have a link quality score or measurement. An overall link quality score or measurement of a LAN can be determined based on link quality scores for links of all or a subset of client devices accessing network services through the LAN.

In managing steering of a client device based on network service access characteristics, the network service access characteristics specific client device steering system 212 can steer a client device to a network device used by client devices in accessing network device. The network service access characteristics specific client device steering system 212 can steer a client device to an applicable network device used in providing access to network services, such as the basic service network devices and special service network devices described in this paper. For example, if network service access characteristics indicate a client device is configured to access network services using MU-MIMO, then the network service access characteristics specific client device steering system 212 can steer the client device to a special service network device. In another example, if network service access characteristics indicate a client device is configured to access network services according to IEEE 802.11n, then the network service access characteristics specific client device steering system 212 can steer the client device to a basic service network device. In yet another example, if network service access characteristics indicate a special service network device is only providing one client device network service access using MU-MIMO, then the network service access characteristics specific client device steering system 212 can steer another client device to the special service network device.

In managing steering of a client device based on network service access characteristics, the network service access characteristics specific client device steering system 212 can steer a client device to specific radios. The network service access characteristics specific client device steering system 212 can steer a client device to another radio of a network device being used by the client device to gain access to network services. For example, if a client device is gaining access to network services through a first 5 GHz radio of a special service network device, and a second 5 GHz radio of the network device is only providing network service access to another client using MU-MIMO, then the network service access characteristics specific client device steering system 212 can steer the client device to access network services through the second 5 GHz radio using MU-MIMO. As shown in the example, in steering client devices to radios, the network service access characteristics specific client device steering system 212 can help to ensure a network device is providing network service access using MU-MIMO to more than one client device, thereby conserving computational resources of the network device. Additionally, the network service access characteristics specific client device steering system 212 can steer a client device to a radio of a network device separate from a network device the client device is currently using to access network services. For example, if a 5 GHz radio of a network device is providing network service access using MU-MIMO to a maximum number of client devices capable of being supported by the radio, then the network service access characteristics specific client device steering system 212 can steer a client device of the client device to a radio of another network device.

In a specific implementation, the network service access characteristics specific client device steering system 212 functions to use an applicable method for steering a client device to a network device or a radio of a network device to actually steer client devices based on network service access characteristics. The network service access characteristics specific client device steering system 212 can use applicable passive steering techniques to steer client devices to network devices or specific radios of network devices. For example, the network service access characteristics specific client device steering system 212 can steer client devices configured to access network services according to IEEE 802.11n to a basic service network device using probe response suppression. Further in the example, using probe response suppression, the network service access characteristics specific client device steering system 212 can cause special service network devices to suppress probes received from the client devices to cause the client devices to probe the basic service network device and subsequently access network services through the basic service network device according to IEEE 802.11n. Still further in the example, the client devices are legacy devices configured to access network services through a network device according to IEEE 802.11n or IEEE 802.11a.

In a specific implementation, the network service access characteristics specific client device steering system 212 functions to use an applicable active steering method to steer clients to network devices or radios of network devices based on network service access characteristics. For example, the network service access characteristics specific client device steering system 212 can use basic service set transition management, in accordance with IEEE 802.11v, to steer a client device from a special service network device to a basic service network device. In another example, the network service access characteristics specific client device steering system 212 can provide or facilitate providing of network information including at least one of the following of neighboring network device reports, beacon reports, and channel reports to a client device, e.g. in accordance with IEEE 802.11k, to steer the client device to either or both a network device and a radio. In yet another example, the network service access characteristics specific client device steering system 212 can use one or a combination of band steering, load balancing, radio balancing, and safety net steering to steer client devices as part of active steering. For example, the network service access characteristics specific client device steering system 212 can cause a network device to disassociate from a client device, thereby causing the client device to associate with another network device in accessing network services.

In a specific implementation, the network service access characteristics specific client device steering system 212 functions to configure a network device to operate in providing client devices network service access. For example, the network service access characteristics specific client device steering system 212 can set a limit on a number of client devices a network device can provide network service access to using MU-MIMO. In configuring a network device to operate in providing client device network service access, the network service access characteristics specific client device steering system 212 can configure a network device to operate as either a basic service network device or a special service network device. For example, the network service access characteristics specific client device steering system 212 can configure radios of a single band dual concurrent network device to simultaneously operate in the 5 GHz frequency band in providing network service access using MU-MIMO, thereby operating as a special service network device. In another example, the network service access characteristics specific client device steering system 212 can cause a network device to operate with an adjustable channel width, thereby operating as a special service network device.

In a specific implementation, in configuring a network device to operate, the network service access characteristics specific client device steering system 212 functions to configure radios of a network device. For example, the network service access characteristics specific client device steering system 212 can cause a radio of a network device to operate in the 2.4 GHz frequency band in providing client devices network service access. The network service access characteristics specific client device steering system 212 can control radios to configure a network device to operate as either a basic service network device or a special service network device. For example, the network service access characteristics specific client device steering system 212 can cause a radio of a single band dual concurrent network device to switch from operating in the 2.4 GHz frequency band to the 5 GHz frequency band, thereby operating as a special service network device.

In a specific implementation, the network service access characteristics specific client device steering system 212 functions to configure network devices to operate in providing network service access based on network service access characteristics. For example, if network service access characteristics indicate a radio of a special service network device operating in the 2.4 GHz frequency band is providing network service access to client devices capable of accessing network services using MU-MIMO in accordance with IEEE 802.11ac, then the network service access characteristics specific client device steering system 212 can cause the radio to operate in the 5 GHz frequency band in providing network services through MU-MIMO. In another example, if network service access characteristics indicate a number of client devices in a region are capable of accessing network services using MU-MIMO in accordance with IEEE 802.11ac, then the network service access characteristics specific client device steering system 212 can cause a single band dual concurrent network device in the region operating as a basic service network device to begin operating as a special service network device.

In a specific implementation, the network service access characteristics specific client device steering system 212 functions to maintain network device operational data. Network device operational data includes applicable data describing past and current operation of a network device in operation to provide network service access. Examples of network device operational data include physical locations of network devices, whether and when a network device is operating as a basic service network device or a special service network device, manners in which a network device is or was operating, and manners in which radios of a network device are or were operating. For example, network device operational data can indicate a network device is a single band dual concurrent network device. In another example, network device operational data can indicate a network device has a dual radio currently operating in the 2.4 GHz frequency band in providing network service access.

In a specific implementation, the network service access characteristics specific client device steering system 212 functions to optimize aggregate link quality. For example, each link a system can have a score. The various scores can be optimized to improve all links or a subset of links, such as to improve link quality along specific paths. Where every link between AP and client has a score, the network service access characteristics specific client device steering system 212 can function to direct a first subset of clients to a special service network device 206 and thereby improve link scores for the clients capable of taking advantage of special services (such as high data rates). Lower-capability clients can instead be directed to basic service network device 204, which may or may not reduce link score (because the lower-capability clients may be incapable of taking advantage of the special services). In the aggregate, because higher-capability clients are associated with higher-capability network devices, link quality should improve. In a specific implementation, the link aggregation take into account the capabilities of client devices so as to differentiate between clients with different capabilities and to avoid being bogged down by lower-performing clients where higher-performing clients could take advantage of higher-capability network devices. This is significant because in many real-world wireless networks, there are many different client devices, some of which take advantage of new technology and others that can be characterized as legacy devices. In response to this real-world challenge, different clients are pushed into different lanes, with "fast" clients in the fast lane and "slow" clients in the slow lane.

In an example of operation of the example system shown in FIG. 2, the client device 210 begins accessing network services of a network over the WLAN 208 through the special service network device 206. In the example of operation of the example system shown in FIG. 2, the network service access characteristics specific client device steering system 212 determines network service access characteristics associated with the client device 210 accessing the network services over the WLAN 208 through the special service network device 206. Further, in the example of operation of the example system shown in FIG. 2, the network service access characteristics specific client device steering system 212 determines whether to steer the client device 210 away from the special service network device 206 to the basic service network device 204 for accessing network services through the basic service network device 204 according to the determined network service access characteristics. If the network service access characteristics specific client device steering system 212 determines to steer the client device 210 from the special service network device 206 to the basic service network device 204, then network service access characteristics specific client device steering system 212 can cause steering of the client device 210 from the special service network device 206 to the basic service network device 204.

Figure 3:
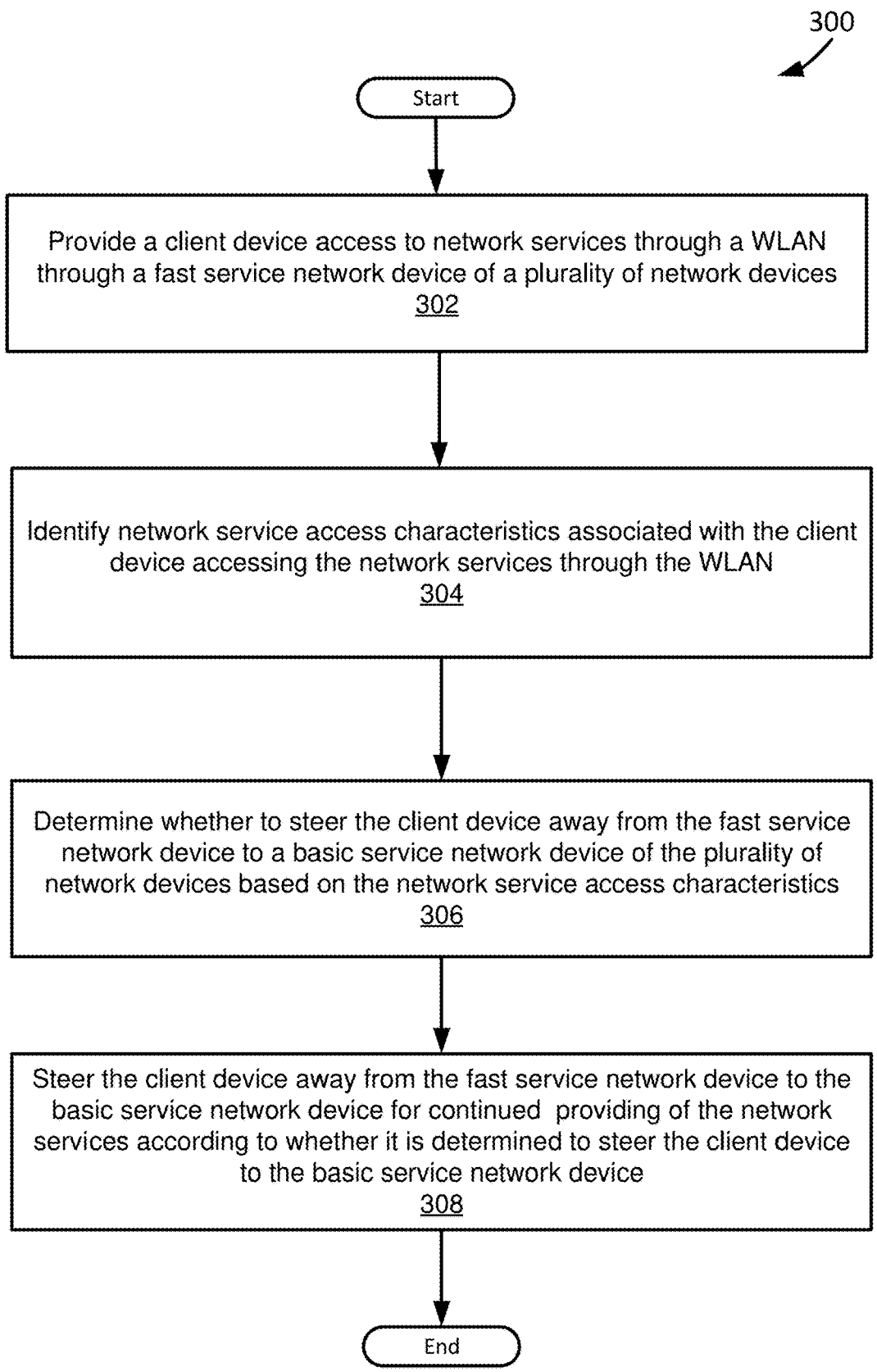
FIG. 3 depicts a flowchart of an example of a method for steering client devices in exploiting network services based on network service access characteristics.

FIG. 3 depicts a flowchart 300 of an example of a method for steering client devices in exploiting network services based on network service access characteristics. The method shown in flowchart 300 can be used to steer client devices between a basic service network device and a special service network device for purposes of the client devices accessing network services through the basic service network device and the special service network device. The flowchart 300 begins at module 302, where a client device is provided access to network services using a WLAN through a special service network device of a plurality of network devices. A special service network device configured to provide a client device access to network services through a WLAN, can be a single band dual concurrent network device configured to operate as a special service network device.

The flowchart 300 continues to module 304, where network service access characteristics associated with the client device accessing the network services through the WLAN are identified. An applicable system for managing steering of client devices according to network service access characteristics in exploitation of network services, such as the network service access characteristics specific client device steering systems described in this paper, can identify network service access characteristics associated with the client device accessing the network services through the WLAN. For example, it can be determined whether the client device is configured to access network services through MU-MIMO using a radio operating in the 5 GHz frequency band as part of determining network service access characteristics associated with the client device accessing the network services through the WLAN.

The flowchart 300 continues to module 306, where it is determined whether to steer the client device away from the special service network device to a basic service network device of the plurality of network devices based on the network service access characteristics. An applicable system for managing steering of client devices for network service access based on network service access characteristics, such as the network service access characteristics specific client device steering systems described in this paper, can determine whether to steer the client device away from the special service network device to a basic service network device. For example, if the client device is not configured to access network services using IEEE 802.11ac according to the determined network service access characteristics, then it can be determined to steer the client device away from the special service network device to a basic service network device of the plurality of network devices.

The flowchart 300 continues to module 308, where the client device is steered away from the special service network device to the basic service network device for continued providing of the network services according to whether it is determined to steer the client device to the basic service network device. An applicable system for managing steering of client devices for network service access based on network service access characteristics, such as the network service access characteristics specific client device steering systems described in this paper, can steer the client device to the basic service network device if it is determined to steer the client device away from the special service network device in the client device accessing network services. Either or both an active or passive steering mechanism can be used to steer the client device away from the special service network device to the basic service network device.

Figure 4:
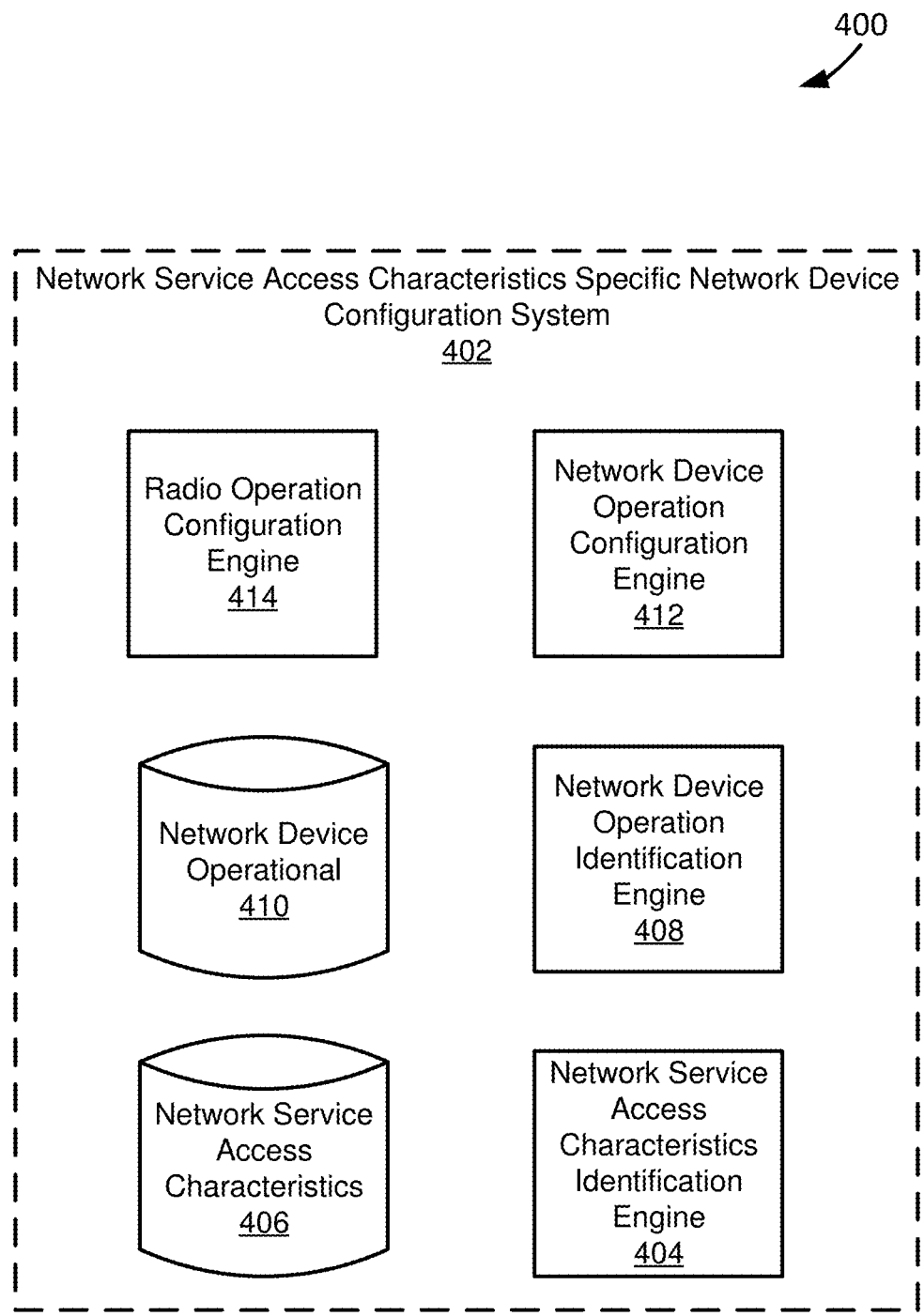
FIG. 4 depicts a diagram of an example of a network service access characteristics specific network device configuration system.

FIG. 4 depicts a diagram 400 of an example of a network service access characteristics specific network device configuration system 402. The network service access characteristics specific network device configuration system 402 is intended to represent a system that functions to configure a network device to operate according to network service access characteristics. The network service access characteristics specific network device configuration system 402 can configure a network device to operate based on specific network service access characteristics. For example, if network service access characteristics indicate a large number of wave 2 MU-MIMO compatible devices are attempting to access network services in a region, then the network service access characteristics specific network device configuration system 402 can configure a network device in the region to operate as a special service network device, e.g. to provide network service access as a wave 2 device using MU-MIMO in accordance with IEEE 802.11ac.

In a specific implementation, in configuring network devices to operate based on network service access characteristics, the network service access characteristics specific network device configuration system 402 functions to configure radios of the network devices. For example, the network service access characteristics specific network device configuration system 402 can configure a radio of a network device providing network service access to client devices using the 2.4 GHz frequency band to begin providing network service access to client devices using the 5 GHz frequency band. Conversely, in another example, the network service access characteristics specific network device configuration system 402 can configure a radio of a network device providing network service access to client devices using the 5 GHz frequency band to begin providing network service access to client devices using the 2.4 GHz frequency band. The network service access characteristics specific network device configuration system 402 can control radios of single band dual concurrent network devices based on network service access characteristics.

In a specific implementation, the network service access characteristics specific network device configuration system 402 functions to maintain network device operational data. The network service access characteristics specific network device configuration system 402 can maintain network device operational data based on current operating of a network device. For example, if a network device switches from operating as a basic service network device to a special service network device, then the network service access characteristics specific network device configuration system 402 can update network device operational data to indicate the network device is currently operating as a special service network device. Network device operational data maintained by the network service access characteristics specific network device configuration system 402 can be used in configuring network devices to operate according to network service access characteristics. For example, if the network service access characteristics specific network device configuration system 402 determines to configure a network device to operate as a special service network device based on network service access characteristics, and network device operational data indicates the network device is already operating as a special service network device, then the network service access characteristics specific network device configuration system 402 can refrain from changing operation of the network device.

In a specific implementation, the network service access characteristics specific network device configuration system 402 functions to be implemented as part of an applicable system for managing client device steering in accessing network services based on network service access characteristics, such as the network service access characteristics specific client device steering systems described in this paper. The network service access characteristics specific network device configuration system 402 can be implemented, at least in part, at a network device configured to provide a client device access to network services through a WLAN. For example, the network service access characteristics specific network device configuration system 402 can be implemented at a special service network device. Additionally, the network service access characteristics specific network device configuration system 402 can be implemented, at least in part, remote from a network device configured to provide a client device access to network services through a WLAN. For example, the network service access characteristics specific network device configuration system 402 can be implemented, at least in part, remote from a basic service network device.

In the example of FIG. 4, the network service access characteristics specific network device configuration system 402 includes a network service access characteristics identification engine 404, a network service access characteristics datastore 406, a network device operation identification engine 408, a network device operational datastore 410, a network device operation configuration engine 412, and a radio operation configuration engine 414. The network service access characteristics identification engine 404 is intended to represent an engine that functions to determine network service access characteristics. Network service access characteristics determined by the network service access characteristics identification engine 404 can be used in configuring network devices to operate in providing access to network services. For example, if network service access characteristics determined by the network service access characteristics identification engine 404 indicate a large number of legacy client devices are accessing network services in a region, then a special service network device in the region can be configured to operate as a basic service network device in providing the legacy devices access to network services. The network service access characteristics identification engine 404 can use applicable methods to determine network service access characteristics. For example, the network service access characteristics identification engine 404 can determine network service access characteristics based on retry rates in providing a client device access to network services.

In a specific implementation, the network service access characteristics identification engine 404 functions to identify link quality measurements included as part of network service access characteristics. The network service access characteristics identification engine 404 can use applicable methods for determining factors related to network performance in identifying link quality measurements. For example, the network service access characteristics identification engine 404 can use applicable methods for determining operational capabilities and characteristics of a client device in accessing network services, data rates in providing access to network services, packet error rates in providing access to network services, and a number of retries in providing access to network services for purposes of identifying link quality measurements.

In a specific implementation, the network service access characteristics identification engine 404 functions to maintain a client device profile in identifying network service access characteristics. A client device profile can indicate operational parameters at which a client device is operating or capable of operating. For example, the network service access characteristics identification engine 404 can maintain a client device profile indicating a client device is capable of accessing network services through a wave 2 device using MU-MIMO.

Returning back to FIG. 4, the network service access characteristics datastore 406 is intended to represent a datastore that functions to store network service access characteristics data. Network service access characteristics data indicates determined network service access characteristics of providing network service access, e.g. within a LAN, at any given time. For example, network service access characteristics data stored in the network service access characteristics datastore 406 can indicate a number of legacy client devices accessing network services through a LAN at a specific time.

The network device operation identification engine 408 is intended to represent an engine that functions to maintain characteristics of network devices in operation to provide access to network services. The network device operation identification engine 408 can maintain network device operational data indicating characteristics of network devices in operation to provide access to network services. For example, the network device operation identification engine 408 can determine a network device is operating as a special service network device, and subsequently update network device operational data to indicate the network device is operating as a special service network device. The network device operation identification engine 408 can maintain characteristics of network devices in operation to provide access to network services based on input received from a network planner or an entity responsible for physically setting up network devices. For example, the network device operation identification engine 408 can generate network device operational data to indicate a location of a network device and operational characteristics of a network device based on input received from an entity that physically installs the network device. Further in the example, the network device operation identification engine 408 can generate the network device operational data to indicate operational capabilities of the network device, e.g. that the network device is a single band dual concurrent network device.

The network device operational datastore 410 is intended to represent a datastore that stores network device operational data. Network device operational data stored in the network device operational datastore 410 can be generated based on input received from a network planner or an entity responsible for physical installing network devices to form a LAN. Additionally, network device operational data stored in the network device operational datastore 410 can be updated to indicate a current operating state of a network device. For example, network device operational data stored in the network device operational datastore 410 can be updated to indicate a network device has switched from operating as a basic service network device to operating as a special service network device.

The network device operation configuration engine 412 is intended to represent an engine that functions to configure a network device to operate in providing access to network services based on network service access characteristics. In configuring a network device to operate, the network device operation configuration engine 412 can configure a network device to operate as either a basic service network device or a special service network device. For example, the network device operation configuration engine 412 can configure a network device to operate at its maximum transmission power in providing access to network services. In another example, the network device operation configuration engine 412 can configure a network device by adjusting either or both a transmit power and a receive power at which the network device operates according to a signal to noise ratio associated with a client device accessing network services through the network device.

In a specific implementation, the network device operation configuration engine 412 functions to configure a network device to operate in providing access to network services based on characteristics of the network device in operation to provide network service access. For example, if the network device operation configuration engine 412 determines a network device should operate as a basic service network device and characteristics of the network device in operation indicate the network device is operating as a basic service network device, then the network device operation configuration engine 412 can refrain from reconfiguring the network device in operation. In using characteristics of a network device in operation to configure the network device, the network device operation configuration engine 412 can configure the network device to operate based on network service access characteristics. For example, if the network device operation configuration engine 412 determines a network device should operate as a special service network service, based on network service access characteristics, and determines the network device is operating as a basic service network device, based on characteristics of the network device in operation, then the network device operation configuration engine 412 can configure the network device to operate as a special service network device.

Returning back to FIG. 4, the radio operation configuration engine 414 is intended to represent an engine that functions to configure radios of a network device to operate in providing access to network services based on network service access characteristics. In configuring radios of a network device, the radio operation configuration engine 414 can control operational parameters at which the radios operate in providing network service access. For example, in configuring a radio of a network device to operate, the radio operation configuration engine 414 can configure a radio of a network device to operate in the 2.4 GHz or 5 GHz frequency band. In configuring a radio of a network device to operate in the 2.4 GHz or 5 GHz frequency band, the radio operation configuration engine 414 can effectively configure the network device to operate as either a special service network device or a basic service network device. In another example, in configuring a radio of a network to operate, the radio operation configuration engine 414 can cause the radio to support providing network service access through MU-MIMO. In yet another example, in configuring a radio of a network to operate, the radio operation configuration engine 414 can cause a radio adjust its channel width, e.g. to 20 MHz, 40 MHz, or 80 MHz used in providing network service access.

In a specific implementation, the radio operation configuration engine 414 functions to configure radios of a network device to operate in providing access to network services based on characteristics of the network device in operation to provide network service access. For example, if the radio operation configuration engine 414 determines a network device should operate as a basic service network device and characteristics of the network device in operation indicate the network device is operating as a basic service network device, then the radio operation configuration engine 414 can refrain from reconfiguring radios of the network device in operation. In using characteristics of a network device in operation to configure radios of the network device, the radio operation configuration engine 414 can configure the radios of the network device to operate based on network service access characteristics. For example, if the radio operation configuration engine 414 determines a network device should operate as a special service network service, based on network service access characteristics, and determines the network device is operating as a basic service network device, based on characteristics of the network device in operation, then the radio operation configuration engine 414 can configure the radios to cause the network device to operate as a special service network device.

In an example of operation of the example network service access characteristics specific network device configuration system 402 shown in FIG. 4, the network service access characteristics identification engine 404 determines network service access characteristics of a plurality of network devices in providing client devices access to network services. In the example of operation of the example system shown in FIG. 4, the network service access characteristics identification engine 404 updates network service access characteristics data stored in the network service access characteristics datastore 406 to indicate the identified network service access characteristics. Further in the example system shown in FIG. 4, the network device operation identification engine 408 determines characteristics of the network devices in operation to provide network service access to the client devices. In the example system shown in FIG. 4, the network device operation identification engine 408 maintains network device operational data stored in the network device operational datastore 410 to indicate the determined characteristics of the network devices in operation to provide network service access to the client devices.

In the example of operation of the example system shown in FIG. 4, the network device operation configuration engine 412 configures a network device or refrains from reconfiguring a network device of the plurality of network devices to operate in providing access to network services based on the identified network service access characteristics and the determined characteristics of the network devices in operation to provide network service access. Additionally, in the example of operation of the example system shown in FIG. 4, the radio operation configuration engine 414 configures radios of a network device or refrains from reconfiguring radios of a network device of the plurality of network devices to operate in providing access to network services based on the identified network service access characteristics and the determined characteristics of the network devices in operation to provide network service access.

Figure 5:
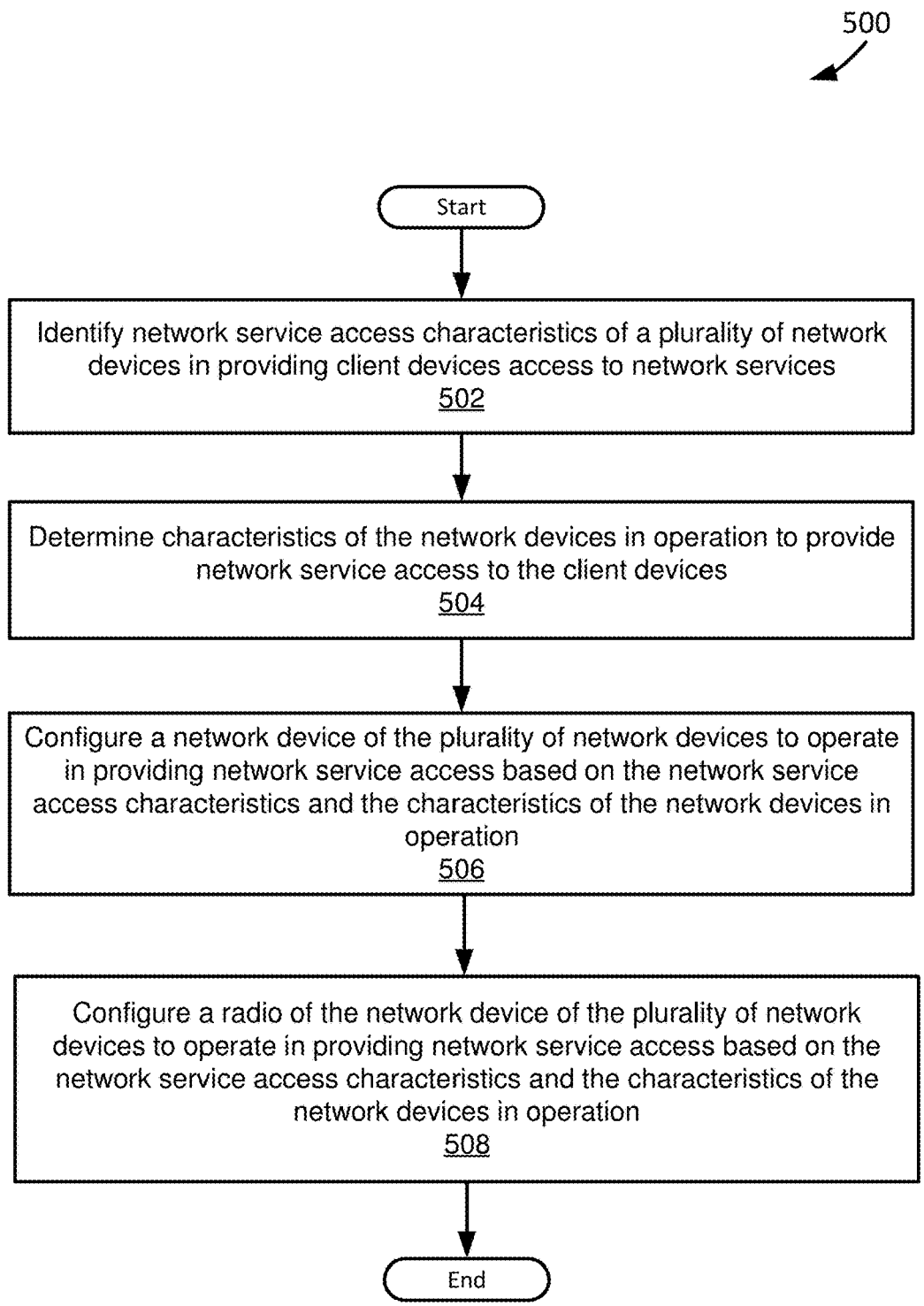
FIG. 5 depicts a flowchart of an example of a method of configuring a network device to operate in providing network service access based on network service access characteristics.

FIG. 5 depicts a flowchart 500 of an example of a method of configuring a network device to operate in providing network service access based on network service access characteristics. The flowchart 500 begins at module 502, where network service access characteristics of a plurality of network devices in providing client devices access to network services through a WLAN are identified. An applicable engine for identifying network service access characteristics, such as the network service access characteristics identification engines described in this paper, can identify network service access characteristics of a plurality of network devices in providing client devices access to network services. Identified network service access characteristics can include characteristics of the plurality of network devices. For example, identified network service access characteristics can include whether network devices of the plurality of network devices are configured to access network services through a wave 2 network device using MU-MIMO. In another example, identified network service access characteristics can include whether network devices of the plurality of network devices are legacy network devices.

The flowchart 500 continues to module 504, where characteristics of the network devices in operation to provide network access to the client devices are determined. An applicable engine for determining network device operation characteristics, such as the network device operation identification engines described in this paper, can determine characteristics of a the network devices in operation to provide network service access to the client devices. For example, which network devices of the plurality of network devices are operating as basic service network devices and which are operating as special service network devices can be determined.

The flowchart 500 continues to module 506, where a network device of the plurality of network devices is configured to operate in providing network service access based on the network service access characteristics and the characteristics of the network devices in operation. An applicable engine for configuring a network device to operate in providing network service access based on network service access characteristics, such as the network device operation configuration engines described in this paper, can configure a network device of the plurality of network device to operate in providing network service access based on the network service access characteristics and the characteristics of the network devices in operation. For example, if network service access characteristics indicate a network device of the plurality of network devices is serving client capable of accessing network services through a wave 2 network device using MU-MIMO, and the characteristics of the network devices in operation indicate the network device is operating as a basic service network device, then the network device can be configured to operate as a special service network device.

The flowchart 500 continues to module 508, where a radio of the network device of the plurality of network devices is configured to operate in providing network service access based on the network service access characteristics and the characteristics of the network devices in operation. An applicable engine for configuring a radio of a network device to operate in providing network service access based on network service access characteristics, such as the radio operation configuration engines described in this paper, can configure a radio of the network device of the plurality of network device to operate in providing network service access based on the network service access characteristics and the characteristics of the network devices in operation. For example, if network service access characteristics indicate a radio of the network device of the plurality of network devices is serving client capable of accessing network services through a wave 2 network device using MU-MIMO, and the characteristics of the network devices in operation indicate the radio of the network device is operating in the 2.4 GHz frequency band, then the radio of the network device can be configured to operate in the 5 GHz frequency band.

Figure 6:
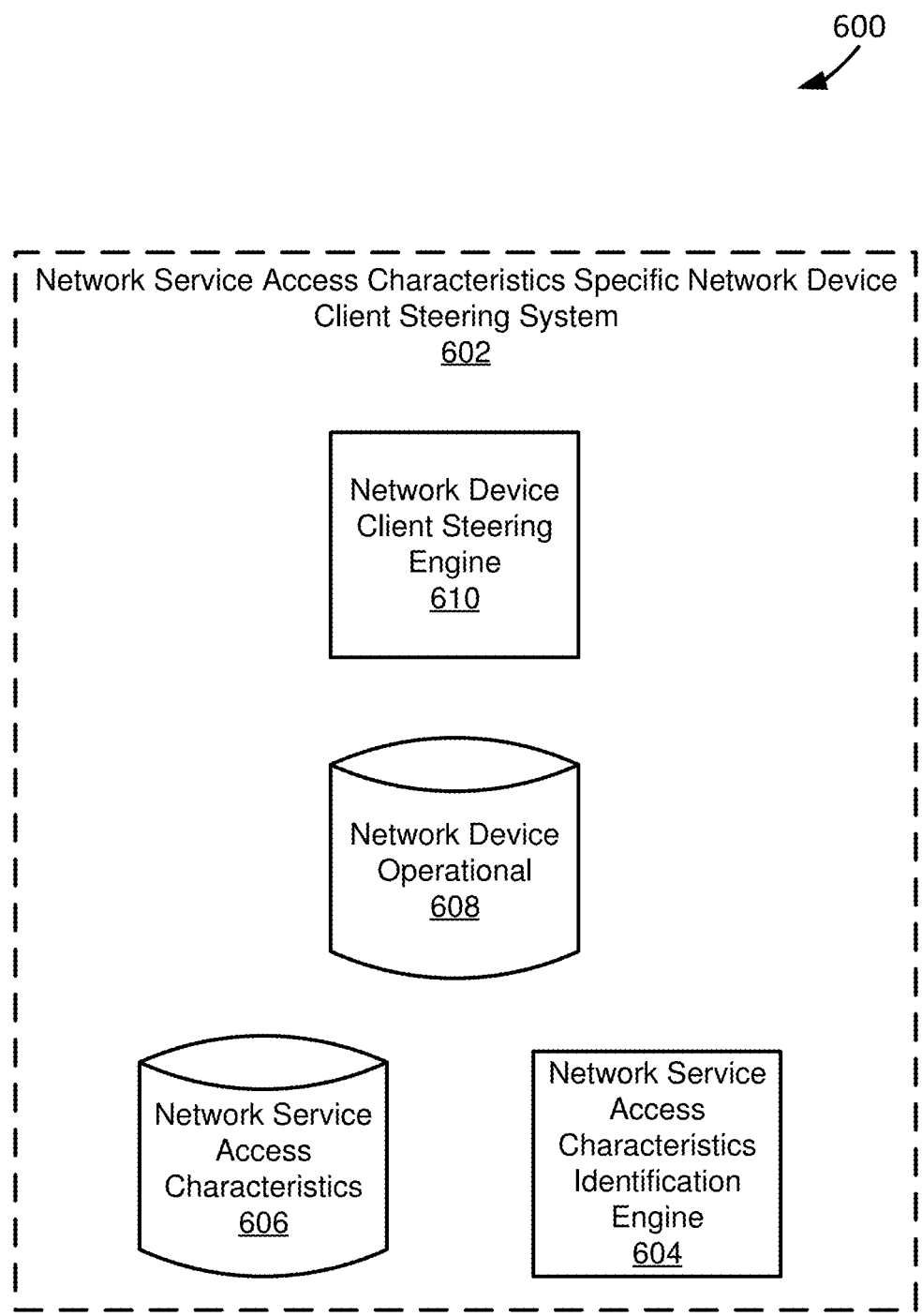
FIG. 6 depicts a diagram of a network service access characteristics specific network device client steering system.

FIG. 6 depicts a diagram 600 of a network service access characteristics specific network device client steering system 602. The network service access characteristics specific network device client steering system 602 is intended to represent a system that functions to steer client devices to network devices based on network service access characteristics. In steering client devices to network devices based on network service access characteristics, the network service access characteristics specific network device client steering system 602 can steer client devices to network devices operating as either a special service network device or a basic service network device. For example, if network service access characteristics indicate a client device is capable of accessing network services through a wave 2 device using MU-MIMO according to IEEE 802.11ac, then the network service access characteristics specific network device client steering system 602 can steer the client device to a network device acting as a special service network device. In another example, if network service access characteristics indicate a client device is a legacy device configured to access network services according to IEEE 802.11n, then the network service access characteristics specific network device client steering system 602 can steer the client device to a network device operating as a basic service network device.

In a specific implementation, the network service access characteristics specific network device client steering system 602 can steer client devices to a network device using network device operational data. Specifically, the network service access characteristics specific network device client steering system 602 can steer client devices to a network device based on characteristics of network devices in operation to provide network service access. For example, if a network device is operating as a basic service network device, based on characteristics of the network device in operation to provide network service access, then the network service access characteristics specific network device client steering system 602 can steer client devices to the network device based on the operation of the network device as a basic service network device. In another example, if a network device is operating as a special service network device, based on characteristics of the network device in operation to provide network service access, then the network service access characteristics specific network device client steering system 602 can steer client devices to the network device based on the operation of the network device as a special service network device.

The network service access characteristics specific network device client steering system 602 functions to use an applicable method for steering a client device to a network device for purposes of steering client devices to network devices based on network service access characteristics. The network service access characteristics specific network device client steering system 602 can use applicable passive steering techniques to steer client devices to specific network devices. For example, the network service access characteristics specific network device client steering system 602 can steer client devices configured to access network services according to IEEE 802.11n to a basic service network device using probe response suppression. Further in the example, using probe response suppression, the network service access characteristics specific network device client steering system 602 can cause special service network devices to suppress probes received from the client devices to cause the client devices to probe the basic service network device and subsequently access network services through the basic service network device according to IEEE 802.11n.

In a specific implementation, the network service access characteristics specific network device client steering system 602 functions to use an applicable active steering method to steer clients between network devices based on network service access characteristics. For example, the network service access characteristics specific network device client steering system 602 can use basic service set transition management, in accordance with IEEE 802.11v, to steer a client device from a special service network device to a basic service network device. In another example, the network service access characteristics specific network device client steering system 602 can provide or facilitate providing of network information including at least one of the following of neighboring network device reports, beacon reports, and channel reports to a client device, e.g. in accordance with IEEE 802.11k, to steer a client device to a network device. In yet another example, the network service access characteristics specific network device client steering system 602 can use one or a combination of band steering, load balancing, radio balancing, and safety net steering to steer client devices to network devices as part of active steering. For example, the network service access characteristics specific network device client steering system 602 can cause a network device to disassociate from a client device, thereby causing the client device to associate with another network device in accessing network services.

In a specific implementation, the network service access characteristics specific network device client steering system 602 functions to be implemented as part of an applicable system for managing client device steering in accessing network services based on network service access characteristics, such as the network service access characteristics specific client device steering systems described in this paper. The network service access characteristics specific network device client steering system 602 can be implemented, at least in part, at a network device configured to provide a client device access to network services through a WLAN. For example, the network service access characteristics specific network device client steering system 602 can be implemented at a special service network device. Additionally, the network service access characteristics specific network device client steering system 602 can be implemented, at least in part, remote from a network device configured to provide a client device access to network services through a WLAN. For example, the network service access characteristics specific network device client steering system 602 can be implemented, at least in part, remote from a basic service network device.

The example network service access characteristics specific network device client steering system 602 shown in FIG. 6 includes a network service access characteristics identification engine 604, a network service access characteristics datastore 606, a network device operational datastore 608, and a network device client steering engine 610. The network service access characteristics identification engine 604 is intended to represent an engine that functions to determine network service access characteristics, such as the network service access characteristics identification engines described in this paper. The network service access characteristics identification engine 604 can determine network service access characteristics at a varying level of network granularity. For example, the network service access characteristics identification engine 604 can determine a link quality measurement overall of a LAN or for a specific client device accessing network services through a network device. In determining network service access characteristics, the network service access characteristics identification engine 604 can maintain network service access characteristics data. For example, the network service access characteristics identification engine 604 can maintain network service access characteristics data indicating a threshold number of legacy devices are accessing network services through a network device.

The network service access characteristics datastore 606 is intended to represent an applicable datastore that functions to store network service access characteristics data, such as the network service access characteristics datastores described in this paper. Network service access characteristics data stored in the network service access characteristics datastore 606 can indicate determined network service access characteristics of providing network service access, e.g. within a LAN, at any given time. For example, network service access characteristics data stored in the network service access characteristics datastore 606 can indicate a number of client devices accessing network services through a LAN at a specific time and configured to access network services through MU-MIMO.

The network device operational datastore 608 is intended to represent an applicable datastore that functions to store network device operational data, such as the network device operational datastores described in this paper. Network device operational data stored in the network device operational datastore 608 can be generated based on input received from a network planner or an entity responsible for physical installing network devices to form a LAN. Additionally, network device operational data stored in the network device operational datastore 608 can be updated to indicate a current operating state of a network device. For example, network device operational data stored in the network device operational datastore 608 can be updated to indicate a network device has switched from operating as a basic service network device to operating as a special service network device.

The network device client steering engine 610 is intended to represent an engine that functions to steer client devices to network devices in accessing network services based on network service access characteristics. In steering client devices to network devices based on network service access characteristics, the network device client steering engine 610 can steer client devices to network devices operating as either a special service network device or a basic service network device. For example, if network service access characteristics indicate a client device is capable of accessing network services through a wave 1 device according to IEEE 802.11ac, then the network device client steering engine 610 can steer the client device to a network device acting as a special service network device.

In a specific implementation, the network device client steering engine 610 can steer client devices to a network device using network device operational data. Specifically, the network device client steering engine 610 can steer client devices to a network device based on characteristics of network devices in operation to provide network service access. For example, if a network device is operating as a basic service network device, indicated by characteristics of the network device in operation to provide network service access, then the network device client steering engine 610 can steer client devices to the network device based on the operation of the network device as a basic service network device. In another example, if a network device is operating as a special service network device, as indicated by characteristics of the network device in operation to provide network service access, then the network device client steering engine 610 can steer client devices to the network device based on the operation of the network device as a special service network device.

The network device client steering engine 610 functions to use an applicable method for steering a client device to a network device for purposes of steering client devices to network devices based on network service access characteristics. The network device client steering engine 610 can use applicable passive steering techniques to steer client devices to specific network devices. For example, the network device client steering engine 610 can steer client devices configured to access network services according to IEEE 802.11n to a basic service network device using probe response suppression. Further in the example, using probe response suppression, the network device client steering engine 610 can cause special service network devices to suppress probes received from the client devices to cause the client devices to probe the basic service network device and subsequently access network services through the basic service network device according to IEEE 802.11n.

In a specific implementation, the network device client steering engine 610 functions to use an applicable active steering method to steer clients between network devices based on network service access characteristics. For example, the network device client steering engine 610 can use basic service set transition management, in accordance with IEEE 802.11v, to steer a client device from a special service network device to a basic service network device. In another example, the network device client steering engine 610 can provide or facilitate providing of network information including at least one of the following of neighboring network device reports, beacon reports, and channel reports to a client device, e.g. in accordance with IEEE 802.11k, to steer a client device to a network device. In yet another example, the network device client steering engine 610 can use one or a combination of band steering, load balancing, radio balancing, and safety net steering to steer client devices to network devices as part of active steering. For example, the network device client steering engine 610 can cause a network device to disassociate from a client device, thereby causing the client device to associate with another network device in accessing network services.

In a specific implementation, the network device client steering engine 610 functions to cause a network device to steer a client device to access network services through another network device based on network service access characteristics. In causing a network device to steer a client device to access network services through another network device, the network device client steering engine 610 can instruct a network device to use an applicable method of steering client devices to steer the client device to access network services through another network device. For example, the network device client steering engine 610 can instruct a network device to use active or passive steering techniques to steer a client device to access network services through another network device.

In an example of operation of the example network service access characteristics specific network device client steering system 602 shown in FIG. 6, the network service access characteristics identification engine 604 determines network service access characteristics of a plurality of network devices providing client devices access to network services. In the example of operation of the example system shown in FIG. 6, the network service access characteristics identification engine 604 maintains network service access characteristics data stored in the network service access characteristics datastore 606 to indicate the determined network service access characteristics. Further, in the example of operation of the example system shown in FIG. 6, the network device operational datastore 608 stores network device operational data indicating characteristics of the plurality of network devices in operating to provide the client devices access to network services. In the example of operation of the example system shown in FIG. 6, the network device client steering engine 610 steers the client devices to network devices of the plurality of network devices based on the network service access characteristics and the characteristics of the plurality of network devices in operation to provide the client devices access to network services.

Figure 7:
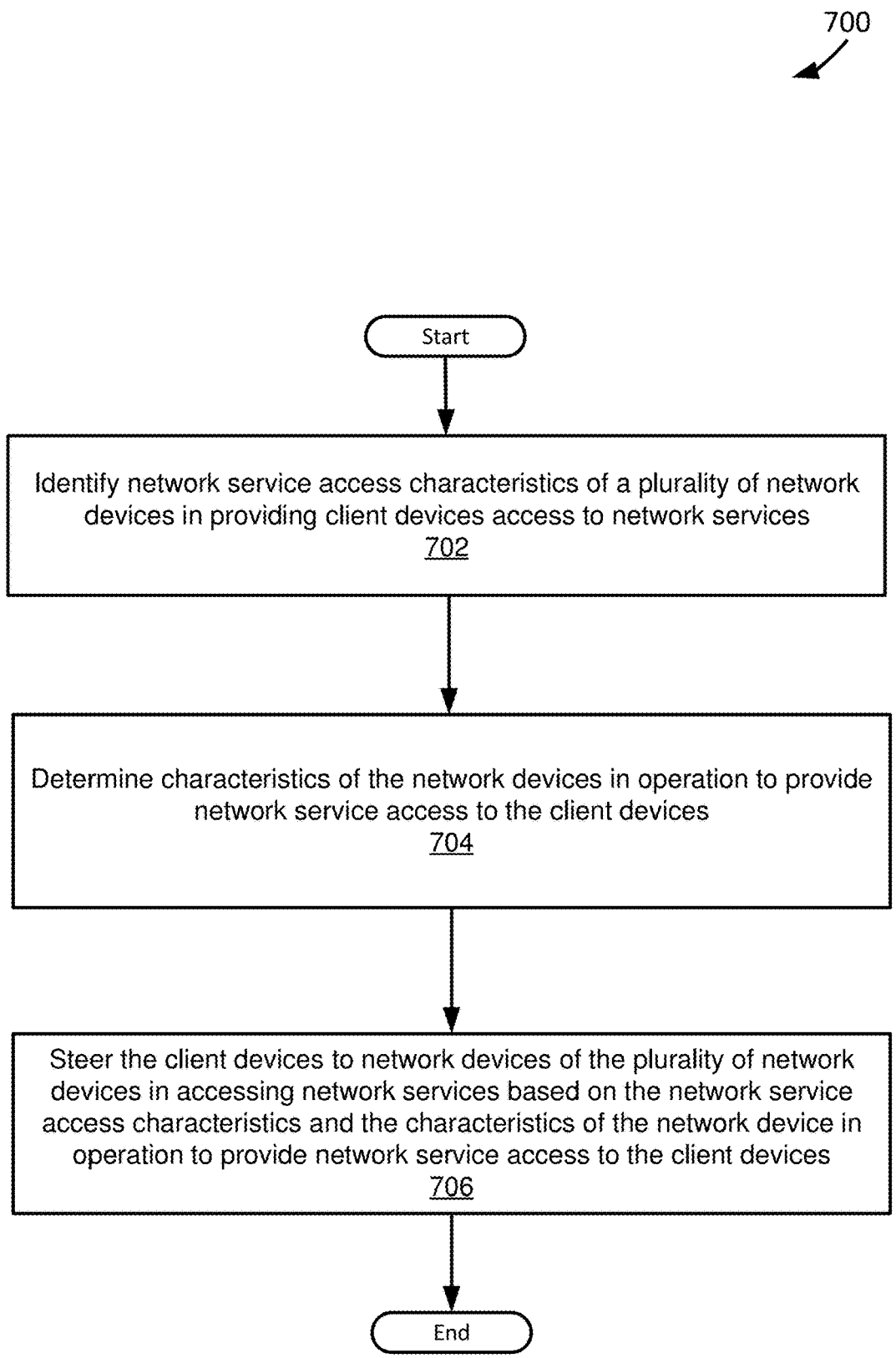
FIG. 7 depicts a flowchart of an example of a method for steering client devices to network devices in accessing network services based on network service access characteristics.

FIG. 7 depicts a flowchart 700 of an example of a method for steering client devices to network devices in accessing network services based on network service access characteristics. The flowchart 700 begins at module 702, where network service access characteristics of a plurality of network devices in providing client devices access to network services through a WLAN are identified. An applicable engine for identifying network service access characteristics, such as the network service access characteristics identification engines described in this paper, can identify network service access characteristics of a plurality of network devices in providing client devices access to network services. Identified network service access characteristics can include characteristics of the plurality of network devices. For example, identified network service access characteristics can include whether network devices of the plurality of network devices are configured to access network services through a wave 2 network device using MU-MIMO. In another example, identified network service access characteristics can include whether network devices of the plurality of network devices are legacy network devices.

The flowchart 700 continues to module 704, where characteristics of the network devices in operation to provide network access to the client devices are determined. An applicable engine for determining network device operation characteristics, such as the network device operation identification engines described in this paper, can determine characteristics of a the network devices in operation to provide network service access to the client devices. For example, which network devices of the plurality of network devices are operating as basic service network devices and which are operating as special service network devices can be determined.

The flowchart 700 continues to module 706, where the client devices are steered to network devices of the plurality of network devices in accessing network services based on the network service access characteristics and the characteristics of the network device in operation to provide network service access to the client devices. An applicable engine for steering client device to network devices in accessing network services, such as the network device client steering engines described in this paper, can steer the client devices to access network services through the plurality of network devices based on the network service access characteristics and the characteristics of the network device in operation to provide network service access to the client devices. For example, a client device configured to access network services according to IEEE 802.11n can be steered to a network device configured to operate as a basic service network device.

Figure 8:
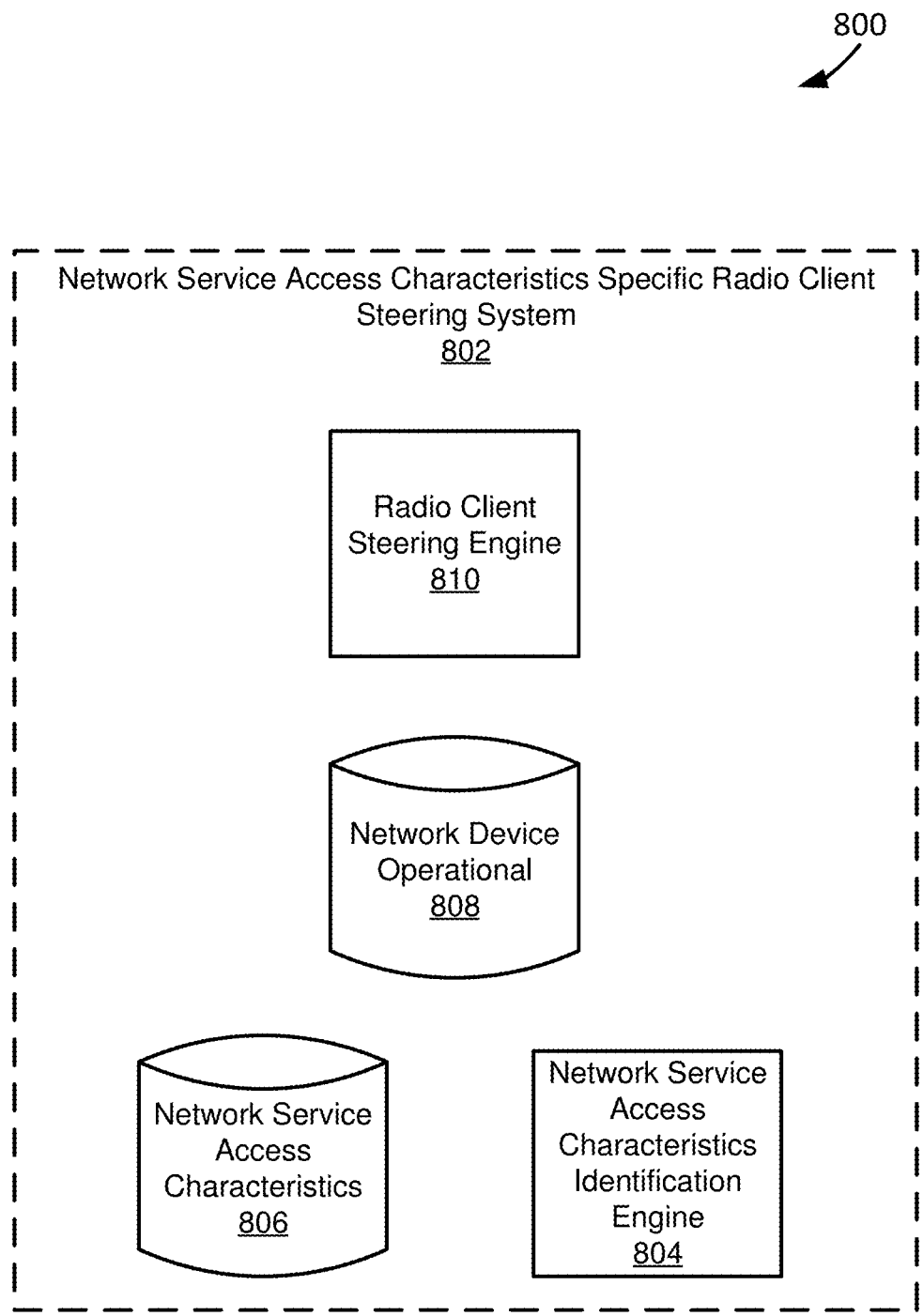
FIG. 8 depicts a diagram of a network service access characteristics specific radio client steering system.

FIG. 8 depicts a diagram 800 of a network service access characteristics specific radio client steering system 802. The network service access characteristics specific radio client steering system 802 is intended to represent a system that functions to steer client devices to a radio of a network device based on network service access characteristics. In steering client devices to a radio of a network device based on network service access characteristics, the network service access characteristics specific radio client steering system 802 can steer client devices to a radio of a network device operating as either a special service network device or a basic service network device. For example, if network service access characteristics indicate a client device is capable of accessing network services through a wave 2 radio using MU-MIMO according to IEEE 802.11ac, then the network service access characteristics specific radio client steering system 802 can steer the client device to a wave 2 radio of a network device acting as a special service network device. In another example, if network service access characteristics indicate a client device is a legacy device configured to access network services according to IEEE 802.11n, then the network service access characteristics specific radio client steering system 802 can steer the client device to a 2.4 GHz radio of a network device operating as a basic service network device.

In a specific implementation, the network service access characteristics specific radio client steering system 802 can steer client devices to a radio of a network device using network device operational data. Specifically, the network service access characteristics specific radio client steering system 802 can steer client devices to a radio of a network device based on characteristics of network devices in operation to provide network service access. For example, if a network device is operating as a basic service network device, according to characteristics of the network device in operation to provide network service access, then the network service access characteristics specific radio client steering system 802 can steer client devices to a radio of the network device operating in the 2.4 GHz frequency band based on the operation of the network device as a basic service network device. In another example, if a network device is operating as a special service network device, according to characteristics of the network device in operation to provide network service access, then the network service access characteristics specific radio client steering system 802 can steer client devices to a radio of the network device based on the operation of the network device as a special service network device.

The network service access characteristics specific radio client steering system 802 functions to use an applicable method for steering a client device to a radio of a network device for purposes of steering client devices to a radios of network devices based on network service access characteristics. The network service access characteristics specific radio client steering system 802 can use applicable passive steering techniques to steer client devices to specific radios of network devices. For example, the network service access characteristics specific radio client steering system 802 can steer client devices configured to access network services according to IEEE 802.11n to a radio of a basic service network device using probe response suppression. Further in the example, using probe response suppression, the network service access characteristics specific radio client steering system 802 can cause special service network devices to suppress probes received from the client devices to cause the client devices to probe the basic service network device and subsequently access network services through the radio of the basic service network device according to IEEE 802.11n.

In a specific implementation, the network service access characteristics specific radio client steering system 802 functions to use an applicable active steering method to steer clients between radios of network devices based on network service access characteristics. For example, the network service access characteristics specific radio client steering system 802 can use basic service set transition management, in accordance with IEEE 802.11v, to steer a client device from a first radio of a special service network device to a second radio of the special service network device. In another example, the network service access characteristics specific radio client steering system 802 can provide or facilitate providing of network information including at least one of the following of neighboring network device reports, beacon reports, and channel reports to a client device, e.g. in accordance with IEEE 802.11k, to steer a client device to a radio of a network device. In yet another example, the network service access characteristics specific radio client steering system 802 can use one or a combination of band steering, load balancing, radio balancing, and safety net steering to steer client devices to radios of network devices as part of active steering. For example, the network service access characteristics specific radio client steering system 802 can cause a radio of a network device to disassociate from a client device, thereby causing the client device to associate with another radio of the network device in accessing network services.

In a specific implementation, the network service access characteristics specific radio client steering system 802 functions to be implemented as part of an applicable system for managing client device steering in accessing network services based on network service access characteristics, such as the network service access characteristics specific client device steering systems described in this paper. The network service access characteristics specific radio client steering system 802 can be implemented, at least in part, at a network device configured to provide a client device access to network services through a WLAN. For example, the network service access characteristics specific radio client steering system 802 can be implemented at a special service network device. Additionally, the network service access characteristics specific radio client steering system 802 can be implemented, at least in part, remote from a network device configured to provide a client device access to network services through a WLAN. For example, the network service access characteristics specific radio client steering system 802 can be implemented, at least in part, remote from a basic service network device.

The example network service access characteristics specific radio client steering system 802 shown in FIG. 8 includes a network service access characteristics identification engine 804, a network service access characteristics datastore 806, a network device operational datastore 808, and a radio client steering engine 810. The network service access characteristics identification engine 804 is intended to represent an engine that functions to determine network service access characteristics, such as the network service access characteristics identification engines described in this paper. The network service access characteristics identification engine 804 can determine network service access characteristics at a varying level of network granularity. For example, the network service access characteristics identification engine 804 can determine a link quality measurement overall of a LAN or for a specific client device accessing network services through a network device. In determining network service access characteristics, the network service access characteristics identification engine 804 can maintain network service access characteristics data. For example, the network service access characteristics identification engine 804 can maintain network service access characteristics data indicating a threshold number of MU-MIMO devices accessing network services through a network device.

The network service access characteristics datastore 806 is intended to represent an applicable datastore that functions to store network service access characteristics data, such as the network service access characteristics datastores described in this paper. Network service access characteristics data stored in the network service access characteristics datastore 806 can indicate determined network service access characteristics of providing network service access, e.g. within a LAN, at any given time. For example, network service access characteristics data stored in the network service access characteristics datastore 806 can indicate a number of client devices accessing network services through a LAN at a specific time and configured to access network services through MU-MIMO.

The network device operational datastore 808 is intended to represent an applicable datastore that functions to store network device operational data, such as the network device operational datastores described in this paper. Network device operational data stored in the network device operational datastore 808 can be generated based on input received from a network planner or an entity responsible for physical installing network devices to form a LAN. Additionally, network device operational data stored in the network device operational datastore 808 can be updated to indicate a current operating state of a network device. For example, network device operational data stored in the network device operational datastore 808 can be updated to indicate a network device has switched from operating as a basic service network device to operating as a special service network device.

The radio client steering engine 810 is intended to represent an engine that functions to steer client devices to a radios of network devices in accessing network services based on network service access characteristics. In steering client devices to radios of network devices based on network service access characteristics, the radio client steering engine 810 can steer client devices to radios of network devices operating as either a special service network device or a basic service network device. For example, if network service access characteristics indicate a client device is capable of accessing network services through a wave 1 device according to IEEE 802.11ac, then the radio client steering engine 810 can steer the client device to a radio of network device acting as a special service network device.

In a specific implementation, the radio client steering engine 810 can steer client devices to a radio of a network device using network device operational data. Specifically, the radio client steering engine 810 can steer client devices to a radio of a network device based on characteristics of network devices in operation to provide network service access. For example, if a network device is operating as a basic service network device, indicated by characteristics of the network device in operation to provide network service access, then the radio client steering engine 810 can steer client devices to a radio of the network device based on the operation of the network device as a basic service network device. In another example, if a network device is operating as a special service network device, as indicated by characteristics of the network device in operation to provide network service access, then the radio client steering engine 810 can steer client devices to a radio of the network device based on the operation of the network device as a special service network device.

The radio client steering engine 810 functions to use an applicable method for steering a client device to a radio of a network device for purposes of steering client devices to radios of network devices based on network service access characteristics. The radio client steering engine 810 can use applicable passive steering techniques to steer client devices to specific radios of network devices. For example, the radio client steering engine 810 can steer client devices configured to access network services according to IEEE 802.11n to a radio of a basic service network device using probe response suppression. Further in the example, using probe response suppression, the radio client steering engine 810 can cause special service network devices to suppress probes received from the client devices to cause the client devices to probe the basic service network device and subsequently access network services through the radio of the basic service network device according to IEEE 802.11n.

In a specific implementation, the radio client steering engine 810 functions to use an applicable active steering method to steer clients between radios of network devices based on network service access characteristics. For example, the radio client steering engine 810 can use basic service set transition management, in accordance with IEEE 802.11v, to steer a client device between radios of a special service network device. In another example, the radio client steering engine 810 can provide or facilitate providing of network information including at least one of the following of neighboring network device reports, beacon reports, and channel reports to a client device, e.g. in accordance with IEEE 802.11k, to steer a client device to a radio of a network device. In yet another example, the radio client steering engine 810 can use one or a combination of band steering, load balancing, radio balancing, and safety net steering to steer client devices to radios of network devices as part of active steering. For example, the radio client steering engine 810 can cause a network device to disassociate from a client device, thereby causing the client device to associate with a radio of another network device in accessing network services.

In a specific implementation, the radio client steering engine 810 functions to cause a network device to steer a client device to access network services through another radio based on network service access characteristics. In causing a network device to steer a client device to access network services through another radio, the radio client steering engine 810 can instruct a network device to use an applicable method of steering client devices to steer the client device to access network services through another radio. For example, the radio client steering engine 810 can instruct a network device to use active or passive steering techniques to steer a client device to access network services through another radio.

In an example of operation of the example network service access characteristics specific radio client steering system 802 shown in FIG. 8, the network service access characteristics identification engine 804 determines network service access characteristics of a plurality of network devices providing client devices access to network services. In the example of operation of the example system shown in FIG. 8, the network service access characteristics identification engine 804 maintains network service access characteristics data stored in the network service access characteristics datastore 806 to indicate the determined network service access characteristics. Further, in the example of operation of the example system shown in FIG. 8, the network device operational datastore 808 stores network device operational data indicating characteristics of the plurality of network devices in operating to provide the client devices access to network services. In the example of operation of the example system shown in FIG. 8, the radio client steering engine 810 steers the client devices to radios of network devices of the plurality of network devices based on the network service access characteristics and the characteristics of the plurality of network devices in operation to provide the client devices access to network services.

Figure 9:
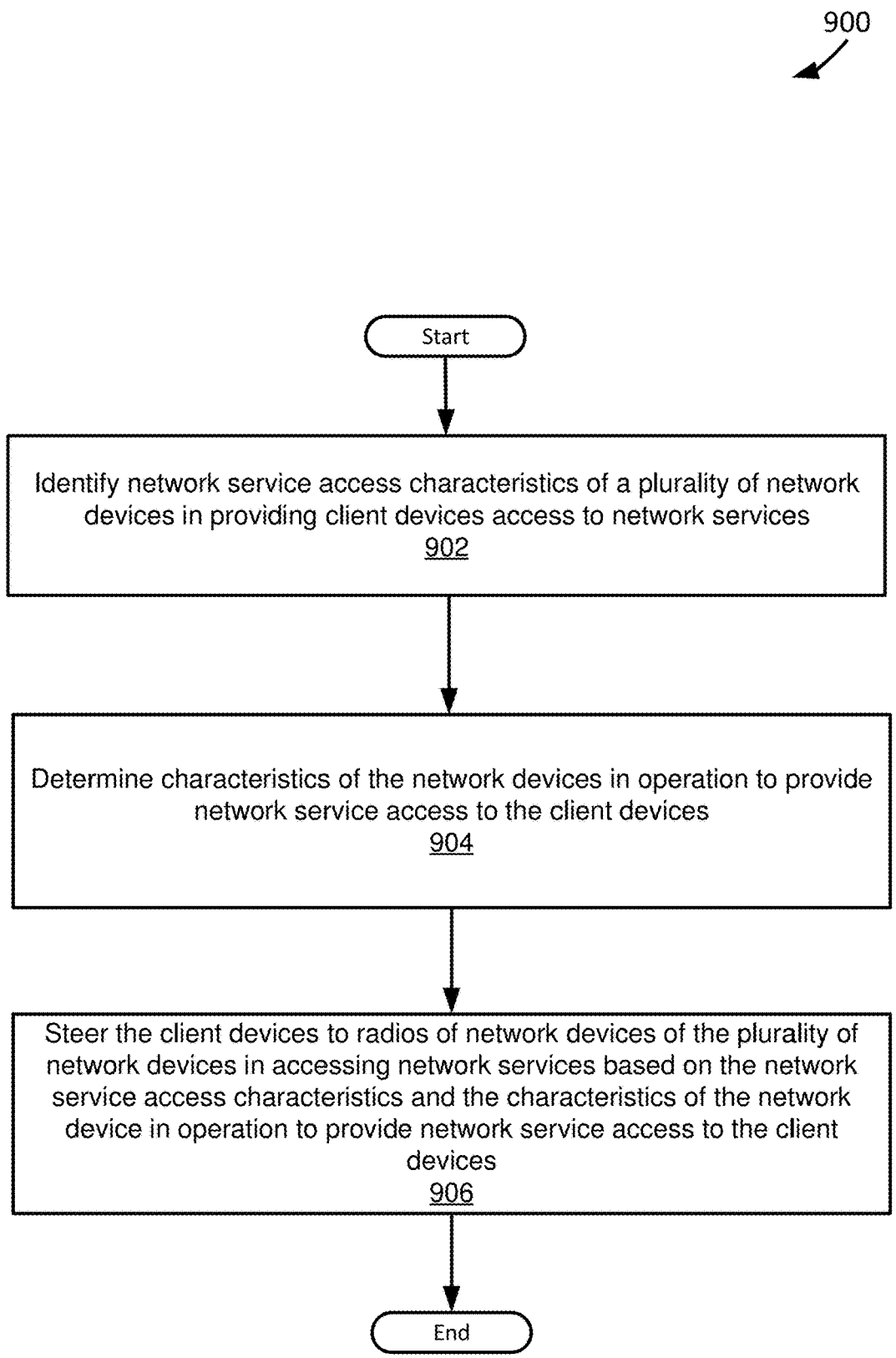
FIG. 9 depicts a flowchart of an example of a method for steering client devices to radios of network devices in accessing network services based on network service access characteristics.

FIG. 9 depicts a flowchart 900 of an example of a method for steering client devices to radios of network devices in accessing network services based on network service access characteristics. The flowchart 900 begins at module 902, where network service access characteristics of a plurality of network devices in providing client devices access to network services through a WLAN are identified. An applicable engine for identifying network service access characteristics, such as the network service access characteristics identification engines described in this paper, can identify network service access characteristics of a plurality of network devices in providing client devices access to network services. Identified network service access characteristics can include characteristics of the plurality of network devices. For example, identified network service access characteristics can include whether network devices of the plurality of network devices are configured to access network services through a wave 2 network device using MU-MIMO. In another example, identified network service access characteristics can include whether network devices of the plurality of network devices are legacy network devices.

The flowchart 900 continues to module 904, where characteristics of the network devices in operation to provide network access to the client devices are determined. An applicable engine for determining network device operation characteristics, such as the network device operation identification engines described in this paper, can determine characteristics of a the network devices in operation to provide network service access to the client devices. For example, which network devices of the plurality of network devices are operating as basic service network devices and which are operating as special service network devices can be determined.

The flowchart 900 continues to module 906, where the client devices are steered to radios of network devices of the plurality of network devices in accessing network services based on the network service access characteristics and the characteristics of the network device in operation to provide network service access to the client devices. An applicable engine for steering client device to radios of network devices in accessing network services, such as the radio client steering engines described in this paper, can steer the client devices to radios of the plurality of network devices for accessing network services based on the network service access characteristics and the characteristics of the network device in operation to provide network service access to the client devices. For example, a client device configured to access network services according to IEEE 802.11ac can be steered to a radio of a network device configured to operate in the 5 GHz frequency band.

Figure 10:
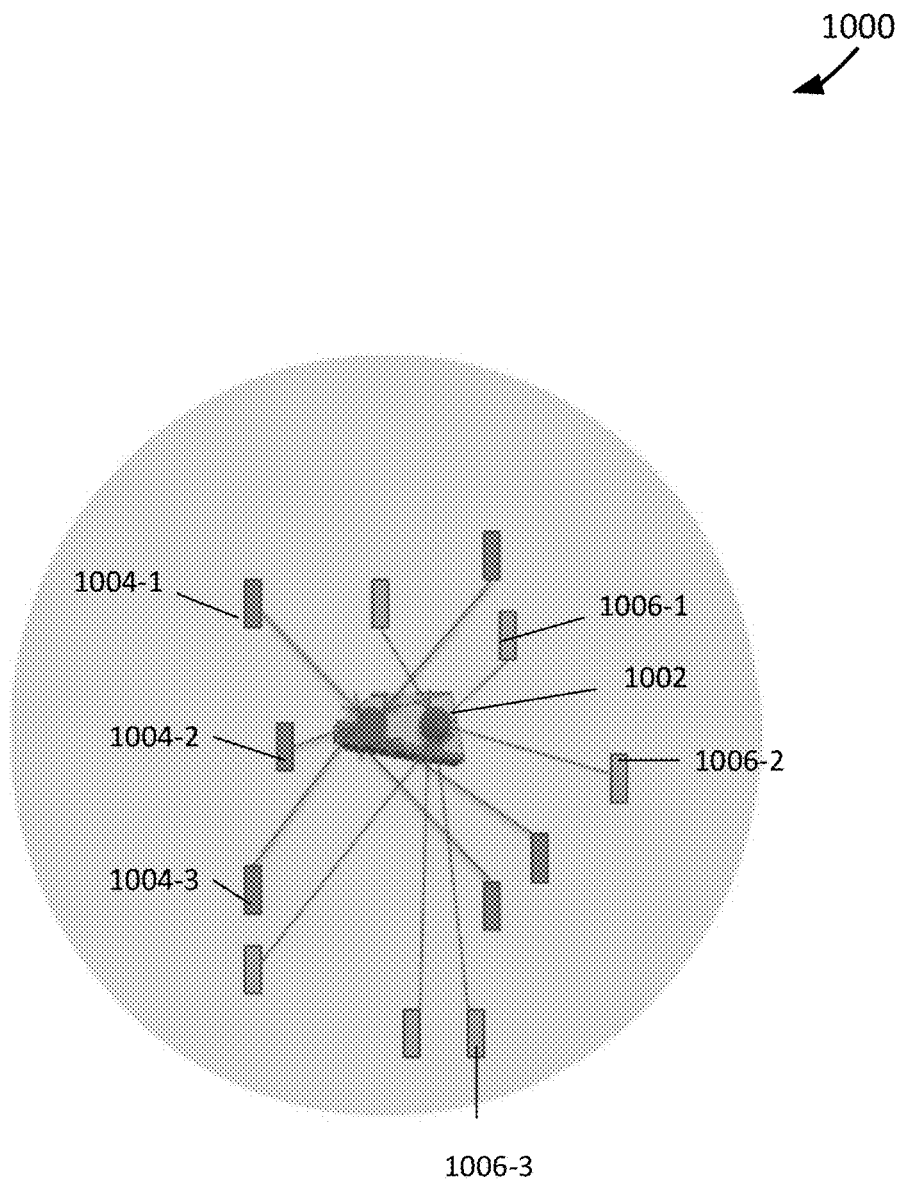
FIG. 10 depicts a network service diagram of a network device in operation to provide network service access to client devices steered to radios of the network device based on network service access characteristics.

FIG. 10 depicts a network service diagram 1000 of a network device 1002 in operation to provide network service access to client devices steered to radios of the network device 1002 based on network service access characteristics. The network device 1002 can be an applicable network device for providing access to network services through a WLAN, such as the special service network devices or basic service network devices described in this paper. The network device 1002 can be a single band dual concurrent network device with a first radio configured to operate in the 5 GHz frequency band and a second dual radio configured to switch between operating in the 2.4 GHz frequency band and the 5 GHz frequency band concurrently with the first radio. The network device 1002 can be configured to provide network service access in accordance with IEEE 802.11ac using MU-MIMO. The network device 1002 can be statically configured to operate in providing network service access at planning of a network or installation of the network device 1002. For example, the network device 1002 can be statically set to operate as a basic service network device. Additionally, the network device 1002 can be dynamically configured to operate in providing network service access as the network device 1002 is operating to provide network service access. For example, the network device 1002 can be dynamically configured to switch from operating as a special service network device to operating as a basic service network device.

The network service diagram 1000 shown in FIG. 10 includes a first group of client devices 1004-1, 1004-2, and 1004-3 (hereinafter referred to as "the first group of client devices 1004") and a second group of client devices 1006-1, 1006-2, and 1006-3 (hereinafter referred to as "the second group of client devices 1006"). The first group of client devices 1004 and the second group of client devices 1006 can be comprised of client devices grouped together based on shared or compatible characteristics, e.g. shared operational capabilities in accessing network services. For example, the first group of client device 1004 can be a group of legacy devices, while the second group of client devices 1006 can be a group of client devices capable of accessing network services through MU-MIMO.

In the network service diagram 1000 shown in FIG. 10, client devices in the first group of client devices 1004 are each accessing network services through a first radio of the network device 1002, while the client devices in the second group of client devices 1006 are each accessing network services through a second radio of the network device 1002. The first radio of the network device 1002 can be operating in the 2.4 GHz frequency band in providing network service access to the first group of client devices 1004 while the second radio of the network device 1002 can be concurrently operation in the 5 GHz frequency band in providing network service access to the second group of client device 1006. Alternatively, the first radio of the network device 1002 can be operating in the 5 GHz frequency band in providing network service access to the first group of client devices 1004 while the second radio of the network device 1002 can be concurrently operation in the 5 GHz frequency band in providing network service access to the second group of client device 1006.

Client devices in the first group of client devices 1004 can be steered to the first radio of the network device 1002 based on network service access characteristics. An applicable engine for steering client devices to radios of network devices, such as the radio client steering engines described in this paper, can steer the client devices to the first radio based on network service access characteristics. Client devices in the second group of client devices 1006 can be steered to the second radio of the network device 1002 based on network service access characteristics. An applicable engine for steering client devices to radios of network devices, such as the radio client steering engines described in this paper, can steer the client devices to the second radio based on network service access characteristics.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
   providing a client device access to network services using a first network device from among a plurality of network devices through a WLAN;
   identifying network service access characteristics associated with the client device accessing the network services through the WLAN using the first network device;
   identifying characteristics of the plurality of network devices in operating to provide network service access to a plurality of client devices;
   determining whether to steer the client device to a second network device of the plurality of network devices based on the network service access characteristics and the characteristics of the plurality of network devices;
   steering the client device to the second network device in response to determining to steer the client device to the second network device; and
   providing the client device access to the network services using the second network device in response to steering the client device to the second network device, wherein the first and second network devices are configured to switch between operating as a special-service network device and a basic-service network device based on a link quality score of a link between each of the plurality of network devices and a respective client device from among the plurality of client.

2. The method of claim 1, wherein the special-service network device is a single band dual concurrent network device with a first radio operating in the 5 GHz frequency band in providing a first subset of client devices from among the plurality of client devices access to network services and a second radio operating in the 5 GHz frequency band in providing a second subset of client devices from among the plurality of client devices access to network services concurrently with the first operating in the 5 GHz frequency band.

3. The method of claim 1, wherein the basic-service network device includes a first radio operating in the 5 GHz frequency band in providing a first subset of client devices from among the plurality of client devices access to network services and a second radio operating in the 2.4 GHz frequency band in providing a second subset of client devices from among the plurality of client devices access to network services concurrently with the first operating in the 5 GHz frequency band.

4. The method of claim 1, wherein the network service access characteristics associated with the client device include operating capabilities of the plurality of client devices in accessing the network services through the WLAN.

5. The method of claim 1, wherein the network service access characteristics include operating capabilities of the plurality of client devices in accessing network services through the plurality of client devices.

6. The method of claim 1, wherein the first network device is configured to operate as the special-service network device and the second network device is configured to operate as the basic-service network device, and the method further comprising configuring the first network device to steer the client device to the second network device using a passive steering technique through probe response suppression in response to a determination to steer the client device to the second network device based on the network service access characteristics and the characteristics of the plurality of network devices.

7. The method of claim 1, wherein the first network device is configured to operate as the special-service network device and the second network device is configured to operate as the basic-service network device, and the method further comprising configuring the special-service network device to steer the client device to the basic-service network device using an active steering technique through basic-service set transition management in response to a determination to steer the client device to the basic-service network device based on the network service access characteristics and the characteristics of the plurality of network devices.

8. The method of claim 1, wherein the network service access characteristics associated with the plurality of client device include a link quality measurement of the client device accessing the network services through the WLAN using the special-service network device.

9. A system, comprising:
   a first network device from among a plurality of network devices configured to provide a client device from among a plurality of client devices access to network services through a WLAN;
   a network service access characteristics identification engine configured to identify network service access characteristics associated with the client device accessing the network services through the WLAN using the first network device;
   a network device operation identification engine configured to identify characteristics of the plurality of network devices in operating to provide network service access to the plurality of client devices;
   a network device client steering engine configured to:
      determine whether to steer the client device to a second network device of the plurality of network devices based on the network service access characteristics and the characteristics of the plurality of network devices;
      steer the client device to the second network device in response to determining to steer the client device to the second network device, wherein the second network device is configured to provide the client device access to the network services in response to the client device being steered to the second network device, and wherein the first and second network devices are configured to switch between operating as a special-service network device and operating as a basic-service network device based on a link quality score of a link between each of the plurality of network devices and a respective client device.

10. The system of claim 9, wherein the special-service network device is a single band dual concurrent network device with a first radio operating in the 5 GHz frequency band in providing a first subset of client devices from among the plurality of client devices access to network services and a second radio operating in the 5 GHz frequency band in providing a second subset of client devices from among the plurality of client devices access to network services concurrently with the first operating in the 5 GHz frequency band.

11. The system of claim 9, wherein the basic-service network device includes a first radio operating in the 5 GHz frequency band in providing a first subset of client devices from among the plurality of client devices access to network services and a second radio operating in the 2.4 GHz frequency band in providing a second subset of client devices from among the plurality of client devices access to network services concurrently with the first operating in the 5 GHz frequency band.

12. The system of claim 9, wherein the network service access characteristics associated with the client device include operating capabilities of the plurality of client devices in accessing the network services through the WLAN.

13. The system of claim 9, wherein the network service access characteristics include operating capabilities of the plurality of client devices in accessing network services through the plurality of client devices.

14. The system of claim 9, wherein the first network device is configured to operate as the special-service network device and the second network device is configured to operate as the basic-service network device, and wherein the network device client steering engine is further configured to cause the special-service network device to steer the client device to the basic-service network device using a passive steering technique through probe response suppression in response to a determination to steer the client device to the basic-service network device based on the network service access characteristics and the characteristics of the plurality of network devices.

15. The system of claim 9, wherein the first network device is configured to operate as the special-service network device and the second network device is configured to operate as the basic-service network device, and wherein the network device client steering engine is further configured to cause the special-service network device to steer the client device to the basic-service network device using an active steering technique through basic-service set transition management in response to a determination to steer the client device to the basic-service network device based on the network service access characteristics and the characteristics of the plurality of network devices.

16. A system, comprising:
means for providing a client device access to network services using a first network device of a plurality of network devices through a WLAN;
means for identifying network service access characteristics associated with the client device accessing the network services through the WLAN using the first network device;
means for identifying characteristics of the plurality of network devices in operating to provide network service access to a plurality of client devices;
means for determining whether to steer the client device to a second network device of the plurality of network devices based on the network service access characteristics and the characteristics of the plurality of network devices;
means for steering the client device to the second network device of the plurality of network devices in response to determining to steer the client device to the second network device;
means for continuing to provide the client device access to the network services using the second network device in response to steering the client device to the second network device, wherein the first and second network devices are configured to switch between operating as a special-service network device and a basic-service network device based on a link quality score of a link between each of the plurality of network devices and a respective client device from among the plurality of client devices.

* * * * *